US012321497B1

(12) United States Patent
Hotchkies et al.

(10) Patent No.: US 12,321,497 B1
(45) Date of Patent: Jun. 3, 2025

(54) AUTHORIZED VIEWS FOR PRIVACY PRESERVATION

(71) Applicant: Block, Inc., Oakland, CA (US)

(72) Inventors: Cameron Hotchkies, Portland, OR (US); Dino Dai Zovi, Brooklyn, NY (US); Matthew Capers, San Francisco, CA (US)

(73) Assignee: Block, Inc., Oakland, CA (US)

( * ) Notice: Subject to any disclaimer, the term of this patent is extended or adjusted under 35 U.S.C. 154(b) by 259 days.

(21) Appl. No.: 18/076,003

(22) Filed: Dec. 6, 2022

Related U.S. Application Data

(60) Provisional application No. 63/290,532, filed on Dec. 16, 2021.

(51) Int. Cl.
*H04L 29/06* (2006.01)
*G06F 21/62* (2013.01)

(52) U.S. Cl.
CPC .............................. *G06F 21/6263* (2013.01)

(58) Field of Classification Search
CPC ............................ G06F 21/6245; G06F 21/62
See application file for complete search history.

(56) References Cited

U.S. PATENT DOCUMENTS

| 8,447,630 | B2 * | 5/2013 | O'Brien | G06Q 20/227 705/3 |
| 2009/0132395 | A1 * | 5/2009 | Lam | G06F 16/9535 705/30 |
| 2020/0320207 | A1 * | 10/2020 | Beno | G06F 21/64 |
| 2021/0081552 | A1 * | 3/2021 | Konita | G06F 21/31 |

* cited by examiner

*Primary Examiner* — Jason K Gee
(74) *Attorney, Agent, or Firm* — Lee & Hayes, P.C.

(57) ABSTRACT

Techniques described herein include providing personal data of users of a payment service to a data service when such users have granted sharing permissions. Then, a query may be configured to determine which of the users are eligible for a promotion from a third party service. The query may be sent to a data service and a query result may be received from the data service based on the third party service provisioning a temporary viewing permission to the payment service. Eligible promotions may be presented to individual users based on the query results.

15 Claims, 14 Drawing Sheets

AUTHORIZED VIEWS FOR PRIVACY PRESERVATION

PRIORITY

This patent application claims priority to U.S. Provisional Patent Application No. 63/290,532 filed Dec. 16, 2021 and entitled "AUTHORIZED VIEWS FOR PRIVACY PRESERVATION," which is fully incorporated by reference herein in its entirety.

TECHNICAL FIELD

Data sharing between entities is problematic due to the sensitive nature of user data. For application-based service providers that share data, security and privacy as both pertain to data sharing is of paramount concern.

BRIEF DESCRIPTION OF THE DRAWINGS

Features of the present disclosure, its nature and various advantages, will be more apparent upon consideration of the following detailed description, taken in conjunction with the accompanying drawings. The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
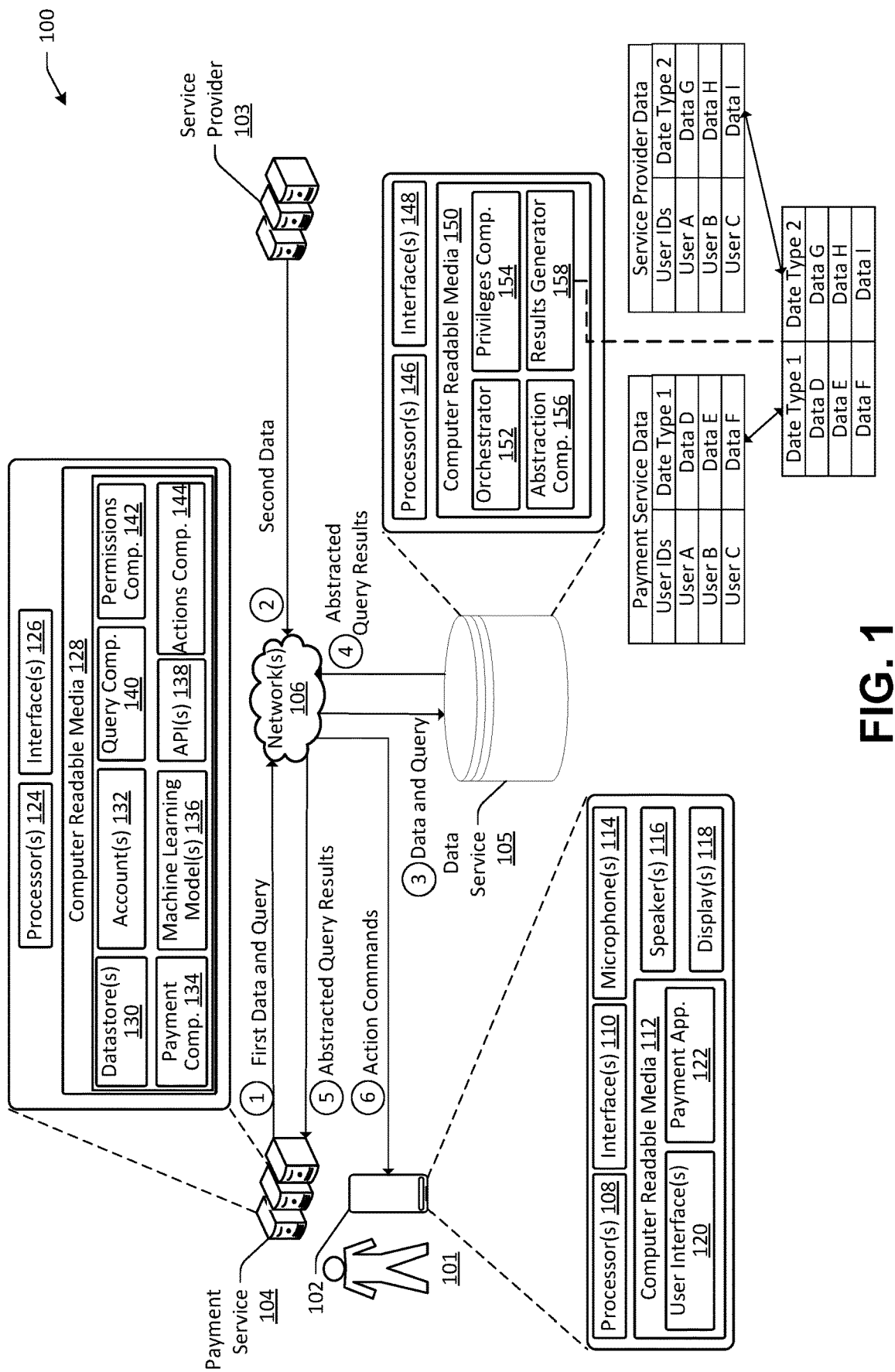
FIG. 1 is an example environment for enabling authorized views for privacy preservation, according to an embodiment described herein.

Techniques described herein are directed to, among other things, the generation and use of a system that allows users of a payment service to share data with other service providers while maintaining security and privacy of shared data. That is, techniques described herein relate to authorized views to preserve privacy and to securely share data between two or more service providers, such as a payment service and a marketing service, a payment service and a music streaming service, a payment service and a payment processing service, a payment service and another payment service, or the like. In some examples, service providers can be first party or third party. As such, maintaining privacy and security are critically important, especially when sharing data, such as personally identifiable information (PII). PII is any representation of information that permits the identity of an individual to whom the information applies to be reasonably inferred by either direct or indirect means. Examples of PII include name, birthdate, social security number, physical address, email address, or the like. It should be understood that any time the sending or receiving of PII is mentioned herein, that sending or receiving of PII is performed when user consent for such sharing has been provided. Techniques described herein relate to enabling authorized views to maintain and preserve privacy and security when sharing data.

In a specific example, promotional campaigns (e.g., sales, advertising, or marketing campaigns that offer incentives or other promotions to drive sales or other metrics) between service providers utilizing a payment service may require sharing data, which may contain PII, between service providers and the payment service. The PII may be used for multiple purposes, including to allow entities to target and identify which type of promotional campaign should be offered to a given customer, or to allow a payment service to report back on the success of any given promotional campaign to a service provider. In conventional techniques, PII, such as an email address, is used as a uniform identifier between multiple parties. Due to privacy and security concerns with sharing PII, it is becoming less and less desirable for PII to be shared with external third parties.

Techniques described herein aim to create a solution to these and other drawbacks where the payment service and an external service provider can share data, without sharing PII or other data, thereby mitigating privacy and security concerns associated with sharing data between external parties. As an example, the payment service and an external service provider (e.g., a marketing service, music streaming service, payment processing service, or the like) can leverage techniques described herein to support targeting for promotional campaigns and for other purposes without sharing PII. That is, techniques described herein enable a service provider, which may be the payment service, to support targeting promotional campaigns with an external service provider, which may be described herein as a partner and/or a third party, without either party sharing information the other does not already have, such as between the payment service and the external service provider using authorized views on centrally stored data. Or, more generally, techniques described herein enable two or more service providers to share data for intended purposes without sharing PII, or other information, between the two or more service providers, that the other does not already have. As such, techniques described herein enable safe and complete data sharing between different parties by allowing partners with varying technical skill levels to interface in a safe, privacy preserving matter.

To do so, a data service, also described herein as a third party data service, can provide a centralized repository for storing or sharing data. In some examples, the data service may be operated by the payment service or another service provider, which may or may not be involved in a data sharing event as described herein. In some examples, service providers that utilize the data service can configure rules, permissions, or conditions to enable temporary access to particular data. That is, in some examples, service providers can configure "authorized views," to enable other service providers to access at least some of their data stored by the data service. For the purpose of this discussion, an "authorized view" can refer to a permission, granted by a party who "owns" or otherwise has exclusive reading, writing, and control privileges of a particular dataset, for another party to read, view, or otherwise access the dataset, or a portion thereof. When authorized, an accessing party is able to read or view the dataset, or a portion thereof, but cannot write, modify, control, or otherwise interact with the data in the dataset. In some examples, the authorization is temporary, for example, in association with a particular query, task, action, date, time, event, or the like. In such examples, the authorization can be terminated after which the accessing party can no longer access (e.g., read or view) the data in the dataset. In some examples, such authorized views can be referred to as "temporary access permissions," "temporary viewing permissions," "temporary reading permissions," "temporary access privileges," "temporary viewing privileges," "temporary reading privileges," or the like. If the data service is utilized in a way where temporary access permissions are provisioned and used, the payment service and the service providers may create an aggregate view on the data stored by the data service in a way that does not expose PII.

In examples, the payment service may have a dataset associated with its users, and a service provider may have a dataset associated with its users. For each of the datasets, identifiers of the users or information about the users may be present. That is, in some examples, each of the datasets can include PII. In some examples, each of the datasets can have one or more common data fields, which can enable data analysis on the datasets in a manner that does not expose PII to external service providers (e.g., service providers other than the service provider with whom the PII is associated). For example, since at least one common data field, such as an email address of users, may be present for two datasets, this common data field may be utilized to "join" the datasets.

Thereafter, the rules, conditions, and permissions associated with the payment service and the service provider at issue may be analyzed to determine whether data sharing is permitted as between the payment service and the service provider and to what extent such data sharing is permitted. In some examples, certain data types may be permitted to be shared while other data types may not, such as a situation where stored rewards data is permitted to be shared while transaction data is not. In other examples, certain data may be permitted to be shared but in an abstracted form, particularly where that data includes and/or is related to PII. In these examples, the data service may identify the data that is to be abstracted and may perform one or more operations to generate an abstracted version of the data at issue before that data is shared with the payment service and/or the service provider. By so doing, the systems and methods described herein may allow for entities to request data sharing, send data that potentially includes PII to a secure data service, receive sharable data associated with other entities without that data including sensitive information such as PII, and maintain a data sharing environment over time in a way that benefits not only the payment service and the service provider(s) but also the users that are associated with the data because their PII is being maintained in a secure and private manner.

Techniques described herein offer improvements to data storage, transmissions, and security. As described, a centralized data storage can store data associated with multiple different entities. Each entity can "own" or otherwise have full reading, writing, and/or control of its data. This can alleviate the need for each entity to store multiple and/or local copies of the data, thereby reducing data storage requirements. As described above, using authorized views, individual entities can enable other entities to read, view, or otherwise access their data. In some examples, such access can enable the centralized data storage to aggregate, merge, analyze, or otherwise process data associated with multiple entities to generate outputs (e.g., query results) that are based on the stored data. As a result, observations or determinations made based on stored data (and not necessarily the data itself) can be transmitted across networks to entity computing devices. In this way, less data is transmitted across the networks and thus computing resources can be conserved. Furthermore, by utilizing authorized views, access to PII data or other sensitive data is limited to the entity with whom the PII data was originally shared. In this way, techniques described herein provide improvements to data security and data privacy.

Utilizing the systems and methods described herein, the computer-centric problem of secure data transfer between computing devices in a way that limits storage requirements as between those computing devices is solved. For example, in existing technologies, data sharing included the sharing of data types that are PII. Examples of these data types include email addresses, physical addresses, user identifiers, etc. Utilizing the systems and methods described herein, the data service may receive datasets from multiple entities that include this PII, but when one of the entities requests the data of the other entity, the data service may send data that does not include the PII and/or that includes an abstracted version of the PII. In an example, the payment service may send data to the data service including transactions that users engaged in and email addresses that were associated with those transactions, and a service provider may send data to the data service including email addresses and rewards data associated with those email addresses. When the payment service requests the data associated with the service provider, the data service may send the rewards data to the payment service but may not send the email addresses as provided by the service provider. In this example, the transmission of data across a network and between the payment service and the service provider is minimized and is less than in atypical data-sharing scheme where the email addresses would have been sent along with the rewards data. Even in examples where a different identifier is sent by the data service in place of the email address, that single identifier is sent as opposed to what could be multiple user identifiers such as email addresses, physical addresses, phone numbers, and the like.

Additionally, the systems and methods described herein may be utilized to solve the computer-centric problem of reducing processing power requirements of the computing systems that are engaged in sharing data. For example, as described just above, when data is shared between the payment service and one or more service providers, that shared data does not include PII and/or includes an abstracted version of PII that is less data intensive than the PII itself. In addition to the data storage savings that are realized as described above, processing power of the computing systems associated with the payment service and the service provider(s) are also decreased because less data is received from the data service and thus less data is subsequently analyzed when the payment service and/or the service provider perform actions associated with that data. Utilizing the example above, the payment service may receive the rewards data from the data service without the email addresses associated therewith. Without the email address data, the payment service may proceed with analyzing that rewards data without parsing the data to remove the email addresses and may instead utilize the rewards data without regard to the email addresses or other PII that is maintained by the data service for the service provider. By so doing, processing power requirements at the payment service and any other computing device that receives sharable data from the data service is decreased as less data is received and processed.

Furthermore, the systems and methods described herein may utilize trained machine learning models to perform one or more operations associated with authorized views of data, which grounds the systems and methods in a particularly computer-centric environment that achieves superior results over what a human could achieve. For example, one or more machine learning models may be generated and trained to determine recommended data types to be shared as between the payment service and one or more service providers, to determine recommended data types that are PII and/or that may be utilized in connection with other data types to reveal PII about users, to determine what information and/or portions of information should be abstracted prior to sending to a requesting party, and/or to determine joinable fields as between datasets, just by way of example. By utilizing trained machine learning models as described herein, the systems and methods are grounded in a computer-centric environment and produce superior results that enhance the security and privacy of data shared utilizing authorized views.

Additionally, the systems and methods described herein solve the computer-centric problem of displaying what is typically a large amount of data on a device with limited screen size. For example, when data is shared between entities and without utilizing the authorized views as described herein, the amount of data including PII may be voluminous and thus the display of that data on a screen of limited size presents a computer-centric challenge. As described more fully herein, utilizing authorized views limits the amount of data that is received from the data service and thus reduces the negative impact of what would otherwise be a voluminous data set. By so doing, more of the relevant data without PII may be displayed on device screens at the same time, reducing the impact of a limited screen size of the device in question.

The systems and methods described herein may also solve the computer-centric problem associated with nefarious actor attack surfaces when sharing data. For example, absent the systems and methods described herein, data including PII may be transferred from one entity to another entity several times and utilizing encryption means that are available to the entities in question, which may change depending on the encryption techniques available to given entities. This presents a nefarious actor with an opportunity to attack the data transfer between entities and procure the PII. Utilizing the systems and methods described herein, data including PII is sent from the payment service to the data service and/or from the service providers to the data service utilizing encryption provided by the data service. Then, once the data including PII is sent to the data service, the data service performs operations that eliminate or drastically limit the sending of such PII again, opting instead for the authorized view operations described herein where PII is not sent and/or is abstracted before being sent. By so doing, the attack surface for a nefarious actor to procure PII is reduced and data is shared between entities more freely, securely, and in a way that promotes data privacy.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 is an example environment 100 for enabling authorized views for privacy preservation, according to an embodiment described herein. The environment 100 of FIG. 1 may include a user 101 associated with a user device 102 and a payment service 104, which can communicate via network(s) 106. A user 101 can be any user of a payment application 122 as described herein. Additionally, the environment 100 of FIG. 1 may include one or more service providers 103 (or otherwise described herein as third party services) and a data service 105. Each of the devices can comprise one or more computing devices. Additional details associated with the user devices 102, the payment service 104, and the network(s) 106 are described below with reference to FIGS. 10-14.

The user devices 102 may include one or more components such as one or more processors 108, one or more network interfaces 110, computer-readable media (CRM) 112, one or more microphones 114, one or more speakers 116, and/or one or more displays 118. The microphones 114 may be configured to receive audio input from the environment 100 and to generate corresponding audio data, which may be utilized as discussed herein. The speakers 116 may be configured to output audio, such as audio associated with a given transaction. The displays 118 may be configured to present graphical user interfaces. In some examples, the displays 118 can output images, videos, or the like via such graphical user interfaces.

The CRM 112 may include one or more applications or other components. For example, the one or more applications or other components can include one or more user interface(s) 120 and/or a payment application 122. A user interface 120 can be included in the payment application 122 as an interstitial, widget, or pop-up display. The CRM 112 can include additional or alternative applications such as a content creation and/or streaming application, a messaging application, an email application, a forum application, a photo application, a calendar application, a ticketing application, a social networking application, or the like. In some examples, the applications can be provided by a same service provider (e.g., the payment service) or different service providers, such as the payment service and one or more third-party service providers.

The applications or other components may be configured to execute in the foreground and background of the user device 102. For example, the payment application 122 may be configured to execute in the foreground when a user is actively engaged in one or more of the functionalities of the payment application 122. In other examples, the payment application 122 may be configured to execute in the background when a user is not actively engaged in one or more of the functionalities, but the payment application 122 is still "open" and is capable of communicating with other applications on the user device 102 and/or with payment service 104 associated with the payment application 122. It should be understood that the user interfaces 120 described herein may include the payment application 122 and may include one or more other user interfaces as described herein. It should also be understood that the payment application 122 or the functionality associated therewith can be integrated into other applications, such as third-party applications.

The payment service 104, which can be associated with one or more computing devices, such as server computing devices, may include components such as one or more processors 124, one or more network interfaces 126, and/or CRM 128. The CRM 128 may include one or more components such as, for example, datastore(s) 130, one or more user accounts 132, a payment component 134, one or more machine learning models 136, one or more application programming interfaces (APIs) 138, a query component 140, a permissions component 142, and/or an actions component 144. These components will be described below by way of example. The CRM 128 can include additional or alternative components and, in some examples, one or more components can be combined.

In at least one example, the payment service 104 can expose functionality and/or services via the one or more APIs 138, thereby enabling functionality and/or services described herein to be integrated into various functional components of the environment 100. The API(s) 138, which can be associated with the payment service 104, can expose functionality described herein and/or avail payment services to various functional components associated with the environment 100. At least one of the API(s) 138 can be a private API, thereby availing services and/or functionalities to functional components (e.g., applications, etc.) that are developed internally (e.g., by developers associated with the payment service). At least one of the API(s) 138 can be an open or public API, which is a publicly available API that provides third-party developers (e.g., merchant platforms described herein) with programmatic access to a proprietary software application or web service of the payment service. That is, the open or public API(s) can enable functionality and/or services of the payment service to be integrated into one or more applications. The API(s) 138 can include sets of options that govern how applications, or other functional components, can interact with one another.

In some examples, the payment service 104 can provide third-party entities with a software developer kit ("SDK") that may utilize functionality exposed by the API(s) 138. The SDK can include software development tools that allow a third-party developer (i.e., a developer that is separate from the payment service) to include functionality and/or avail services as descried herein. The SDK and/or the API(s) 138 may include one or more libraries, programming code, executables, other utilities, and documentation that allows a developer to directly include functionality and/or avail services described herein within an application.

The datastore(s) 130 can store, among other types of data, user profiles. For instance, a user profile of the user can store payment data associated with payment instrument(s) or user account(s) of a user. In some examples, an account maintained by the payment service 104 on behalf of the user can be mapped to, or otherwise associated with, the user profile. Such an account can be associated with a stored balance maintained by the payment service 104. In some examples, funds associated with the stored balance can be received from peer-to-peer payment transactions (e.g., payment transactions between users), deposits from employers, transfers from external accounts of the user, and so on. In some examples, a user profile can indicate multiple user accounts or stored balances associated with a user profile, which can be associated with different assets, such as stocks, cryptocurrency, non-fungible tokens, or the like. In some examples, a user profile can include historical group data, geographic data, customer preferences, subject matter preferences, transaction data, contacts data, social relationship data, user preferences, metadata tag data, and other information associated with participation in the transactions described herein. Additional details associated with data that can be stored in association with user profiles are provided below. The stored data indicating known attributes of payment instruments and/or user accounts may be stored in the datastore 130.

The other components of the payment service 104 are described below as utilized for enabling authorized views.

The data service 105 may include one or more processors 146, one or more network interfaces 148, and/or CRM 150. The CRM 150 may include one or more components such as, for example, an orchestrator 152, a privileges component 154, an abstraction component 156, and/or a results generator 158. Each of these components is described below as utilized for enabling authorized views.

Utilizing the components of the user device 102, the payment service 104, and the data service 105 as described above, authorized views of data held by the data service 105 may be performed. A shown in FIG. 1, at step 1, the payment service 104 may send first data that may include PII to the data service 105. It should be understood that the sending of the first data from the payment service 104 may be performed on condition that users of the payment service 104 have granted permission for sharing such data. The data from the payment service 104 may be received at the orchestrator 152 of the data service 105, which may determine an entity identifier for the entity (here the payment service 104) that sent the first data. The data service 105 may then store the first data to be retrieved in response to query results for data from the payment service 104. This data, as stored by the data service 105 may be stored in association with reading and control privileges that indicate that the payment service 104 has exclusive reading and control privileges of the first data and that certain other entities may also be granted temporary privileges, such as reading, viewing, etc., as described herein. At least some of these privileges may be temporal in nature or otherwise may be provided for a limited time. In examples, one or more triggers and/or conditions may be associated with the temporary privileges, and when the triggers and/or the conditions occur, the privileges may be revoked and/or changed. For example, the payment service 104 may grant a temporary reading privilege to the service provider(s) 103 for certain data from the payment service 104 and held by the data service 105. The triggers and/or conditions may include, for example, when the service provider(s) 103 receive requested data about the payment service 104 from the data service 105, after a certain amount of time lapses from when the payment service 104 sent the data in question, when an attribute associated with the service provider(s) 103 changes (such if the service provider(s) 103 revoke a temporary privilege that the service provider(s) 103 had granted), and the like. It should be understood that these triggers and/or conditions are provided by way of example and the granting, revocation, and changing of privileges by the payment service 104 and/or the service provider(s) 103 may be customizable, configurable, and include other triggers and/or conditions.

In examples, the first data may be stored along with metadata that indicates attributes of the first data, including data types, indicators of PII, indicators of users associated with the first data, and the like. When indicators of users are provided, those indicators may include anonymous user identifiers provided for the users of the payment service 104 by the payment service 104. In addition to the payment service 104 sending the first data to the data service 105 to be stored, at step 2, one or more service providers 103 may also send data, here describes as second data, to the data service 105. It should be understood that any time the sending or receiving of PII is mentioned herein, that sending or receiving of PII is performed when user consent for such sharing has been provided. Again, the orchestrator 152 of the data service 105 may receive the second data and may be configured to cause the second data to be stored at the data service 105 along with metadata as described above. This process of receiving and storing data from multiple entities may be performed over time such that datasets associated with multiple entities may be generated and stored at the data service 105. The first and second data can comprise the same or different data and/or data types. In some examples, portions of the first and second data can correspond or are the same, while other portions of the first and second data are different and do not correspond. In some examples, data can be converted and/or formatted for consistent data storage, such that when queries are received, data can be instantly analyzed in the same format without needing to convert the data at that time.

Prior to sending data that may include PII, the permissions component 142 of the payment service 104 may be utilized to receive user input data indicating rules and/or conditions to be applied for data sent from the payment service 104 to be shared (or not) with service provider(s) 103 and/or for data received from the data service 105 in response to queries for such data. Examples of such rules and/or conditions may include indications of which data types can be shared, which service provider(s) 103 may receive the permitted data, which data types are to be considered to have PII, how frequently data is to be pulled from the datastore 130 and sent to the data service 105, how long permissions are to be maintained, trigger events for provisioning temporary permissions, trigger events for withdrawing permissions, preferences for notifications, formats for data received in response to queries, forms of abstraction that are to be performed on data before being sent to the payment service 104 and/or to one or more of the service providers 103, and the like.

Then, an entity (the payment service 104 in FIG. 1) may send, at step 3, a query to the data service 105 for data associated with one or more service providers 103. To do so, the query component 140 of the payment service 104 may generate a query that indicates one or more attributes of data that is requested from the data service 105. The one or more attributes may include data types, indicators of users associated with the requested data, time periods associated with the requested data, service providers 103 from which the requested data was received, and the like. The query component 140 may generate the query and may send data representing the query to the data service 105. The orchestrator 152 of the data service 105 may receive the query and may determine how to process the query in order to provide results in response to the query.

For example, the orchestrator 152 may utilize the attributes indicated in the query to determine the service provider(s) 103 from which data is requested as well as what data is requested from the service providers 103. It should be understood that while a single service provider 103 is described by way of example at various points in this disclosure, in each of these instances multiple service providers 103 may be involved in the described processes. This data may be sent to the privileges component 154 of the data service 105, which may be configured to determine what data sharing privileges have been enabled for the data to be shared as between the payment service 104 and the service provider 103 in question and for the data that was requested. The privileges component 154 may utilize the data generated by the permissions component 142 of the payment service 104 to determine the rules and/or conditions to be applied to the sharing of data as requested. For example, the payment service 104 may grant a temporary reading privilege to the service provider(s) 103 for certain data from the payment service 104 and held by the data service 105. The rules determined by the privileges component 154 may be associated with which data is allowed to be shared, how long the temporary privilege is to last for, which service provider(s) 103 should be granted permission, what is to be done with the datasets by the data service 105 when the temporary privilege is revoked, and the like. It should be understood that these rules and/or conditions are provided by way of example and the granting, revocation, and changing of privileges by the payment service 104 and/or the service provider(s) 103 may be customizable, configurable, and include other rules and/or conditions. Additionally, rules and/or conditions established by the data service 105 itself and/or one or more of the service providers 103 may also be utilized by the privileges component 154 to determine restrictions and/or permissions for sharing data. By way of example, the data service 105 may have one or more default rules associated with how data is shared between entities. Such rules may include data types that are noted as PII and that are to be abstracted before sending or not sent at all, even in examples where the permissions from the payment service 104 and/or the service provider 103 do not indicate those data types as PII. Other examples of rules from the data service 105 may include an amount of time that data is stored from one or more entities, what is done with datasets when a new dataset is received from an entity, which service providers 103 may communicate with the data service 105, and the like.

One such restriction may be that PII and/or other data types indicated as being not permitted to be shared are to be abstracted from the data sent to the requesting party (here the payment service 104 by way of example) from the data service 105. To do so, the abstraction component 156 of the data service 105 may receive an indication of the data to be abstracted from the privileges component 154 and may perform one or more processes to generate a version of the data in question in an abstracted form. The abstraction may include, for example, removing the data in question from the query result to be sent to the payment service 104, redacting the data to be sent, hashing the data to be sent, vectorizing the data to be sent, and the like. By so doing, the abstraction component 156 may be configured to generate query results that includes the requested data with at least a portion of that data abstracted from view or use by the payment service 104 and/or other entities.

Once data to be abstracted is abstracted (in examples where abstraction occurs), the results generator 158 of the data service 105 may generate query results to be returned to the payment service 104. To do so, the results generator 158 may utilize the query along with a first dataset associated with the payment service 104 and a second dataset associated with the service provider 103 to first determine a joinable field as between the two datasets. A joinable field may be any data field that is common as between the datasets at issue. As described herein, a "common" data field may be determined when the data field for one dataset is the same or substantially similar to a data field for another dataset. Similarities between datasets may be determined and compared to one or more similarity thresholds to determine whether a data field is a common data field as between multiple datasets. By way of example, the first dataset from the payment service 104 may include a customer identifier field as maintained by the payment service 104, an email field, a credit card number field, a transaction date field, a transaction amount field, and the like. The second dataset from the service provider 103 may include a different customer identifier field as maintained by the payment service 104, an email field, a loyalty rewards number field, a loyalty rewards points field, and the like. In this example, the email field is common as between the two datasets and can be used by the results generator to correlate user data from the first dataset with user data from the second dataset. Then, using the rules and/or conditions from the privileges component 154, the results generator 158 may identify the data types to be provided to the payment service 104 in response to the query and generate results data that includes the requested data of the service provider with the PII removed and/or abstracted. The data service 105 may then send, at step 4 and step 5, the query results to the payment service 104 in response to the query.

The payment service 104 may receive the query results and the actions component 144 of the payment service 104 may determine one or more actions to be performed with the received data. The actions may be any actions that the payment service 104 is configured to performed. But by way of example, the actions may include updating user accounts 132 of users of the payment service 104 to include the data received from the data service 105. An example of this may be that the user accounts 132 are updated to include the data received from the data service 105, which may be, for example, loyalty information, rewards information, purchasing information, and/or other data types that may not have been previously stored in association with the user accounts 132. The actions may also include utilizing the received data to populate and/or auto-populate fields of a transaction (such as a customer to merchant transaction and/or a peer to peer transaction). An example of this may be that a physical address of one or more users of the payment service 104 was not previously known to the payment service 104, but the data received from the data service 105 and originating with the service provider 103 may include physical address information. In this example, when a given user of the payment service 104 is involved in a transaction, the physical address information may be utilized to populate and/or auto-populate physical address fields associated with a given transaction. The actions may also include applying and/or offering an incentive to a given user based at least in part on the data received from the data service 105. An example of this may be that the data received from the data service 105 may indicate that an incentive is available from the service provider 103 but that incentive was not previously known to the payment service 104. Depending on the incentive at issue, the incentive may be applied to a transaction occurring with respect to the payment service 104 now that the payment service 104 has data about the incentive as received from the data service 105. The actions may also include targeting a marketing campaign to the user based at least in part on the data received from the data service 105. An example of this may be that the payment service 104 is involved in a targeted marketing campaign to a subset of the users associated with the payment service 104. To determine the subset of the users to target for the marketing, information known about the user may be used to determine which users are likely to make a purchase in light of the marketing. Data from the data service 105 that was not previously known to the payment service 104 may be utilized to help determine which users should be included in the subset of users for the marketing campaign. In some examples, as shown at step 6, the payment service 104 may send one or more commands to the user device 102 to cause the user device 102 to perform the one or more actions. In this example, the actions may include causing the payment application 122 to be enabled, to move to a foreground of the user device 102, and to display information and/or functionality such as interactive links for the user 101.

In addition to the above, some or all of the operations described with respect to the payment service 104 and/or the data service 105 may be performed utilizing one or more machine learning models 136. For example, the one or more machine learning models 136 may be configured to perform operations such as determining recommended data types to be shared as between the payment service 104 and one or more service providers 103, determining recommended data types that are PII and/or that may be utilized in connection with other data types to reveal PII about users, determining what information and/or portions of information should be abstracted prior to sending to a requesting party, and/or determining joinable fields as between datasets, just by way of example. These machine learning models 136 may be generated and then feedback data indicating results of the machine learning models 136 may be gathered overtime. The feedback data and/or other data known to the payment service 104 and/or the data service 105 may be utilized to generate a training dataset that may be utilized to generate one or more trained machine learning models 136 to perform some or all of the operations described herein. Thereafter, for subsequent data queries sent to the data service 105, the trained machine learning models 136 may be utilized to generate query results. Additional details on the use of machine learning models is provided at FIG. 9.

It should be understood that any time user input is utilized to perform an operation as described herein, an intelligent operation or automatic operation may be performed instead such that user input is not required but instead a set of rules, the use of models, etc. is utilized to cause the operation at issue to be performed.

In some implementations, the methods and systems described herein can be integrated with voice services (e.g. Amazon's ALEXA®, Apple's SIRI®, or Microsoft's COR-TANA®) through specific API calls to such services. The present methods and systems can integrate with the "wake words" for invoking their respective voice service, ecommerce and fulfillment channels. For example, speaker recognition techniques may be utilized to determine user profiles associated with users that provide user utterances to user devices for performing one or more of the operations described herein.

Figure 2:
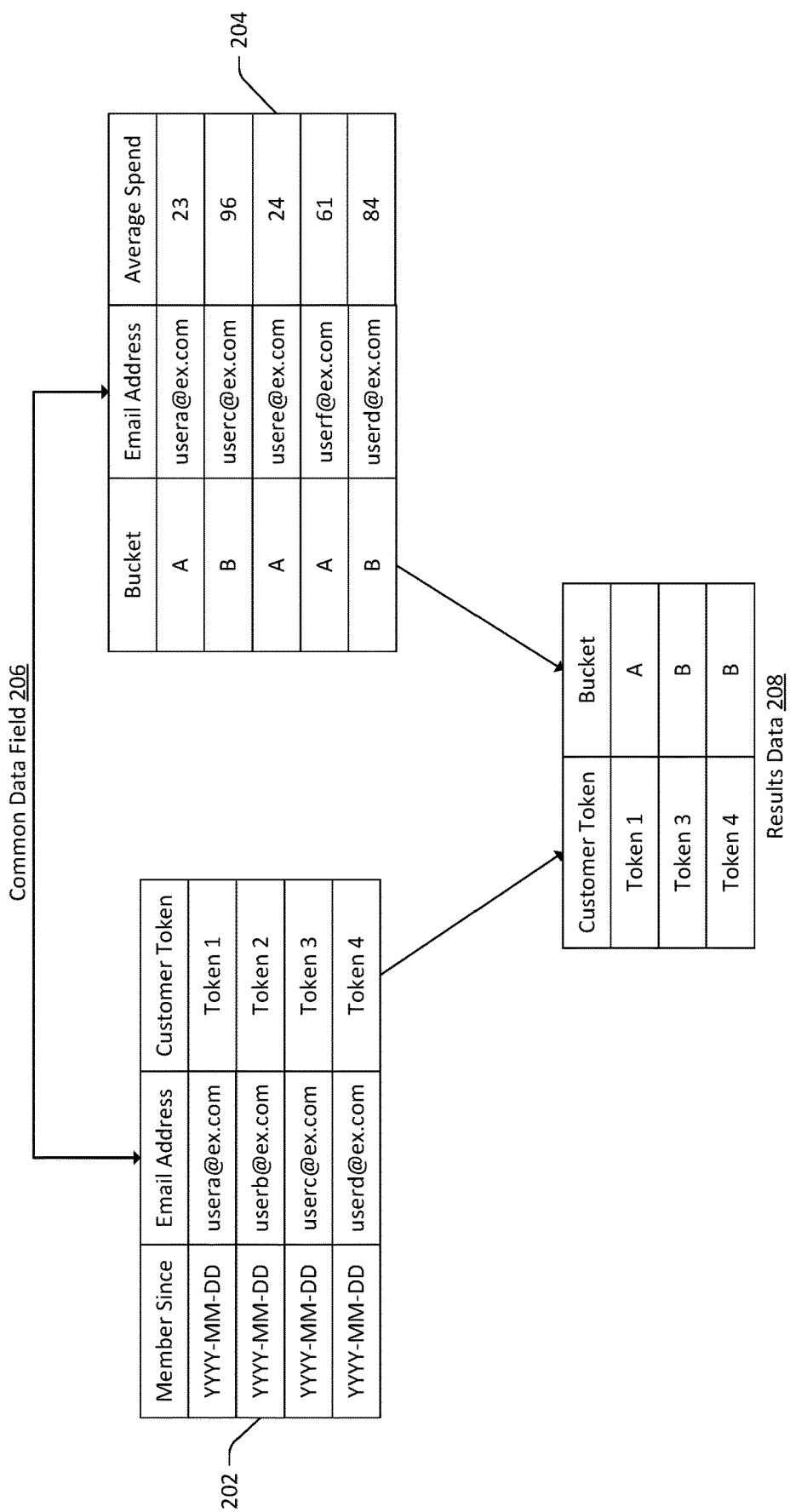
FIG. 2 is an example of datasets and the use of common fields to join datasets, according to an embodiment described herein.

FIG. 2 is an example of datasets and the use of common fields to join datasets, according to an embodiment described herein. FIG. 2 includes representations of two datasets: a first dataset 202 and a second dataset 204. These datasets may be provided by one or more of the payment service 104 and/or one or more service providers 103 as described with respect to FIG. 1.

As illustrated in FIG. 2, the first dataset 202 may be associated with payment service data and may include various data fields, including an email address, a member since field, and a customer token field. The second dataset 204 may be associated with a service provider and may include various data fields, including an email address, a buck field, and an average spend field. The common data field 206, illustrated in FIG. 2 as an email address, can be used to join data associated with the first dataset 202 and the second dataset 204. For example, common data field 206 may be utilized to correlate data from the other fields of the datasets with each other to generate results data 208. Using FIG. 2 as an example, the first dataset 202 includes email addresses for Users A-D (noted as email addresses "usera," "userb" etc.). The second dataset 204 has the common data field 206 of an email address, with Users A, C, and D being common as between the two datasets. Note that the second dataset 204 also includes email addresses for Users E and F, which are not common to the user email addresses in the first dataset 202. Utilizing commonly-identified user email addresses as between the first dataset 202 and the second dataset 204, the data service described herein may aggregate the data, assuming that permissions provided by the payment service and the service provider allow for such aggregation. The results data 208 thus may correlate data types from the first dataset 202 with data types from the second dataset 204 such that when the results data 208 is returned to the payment service the payment service may be able to correlate the received data types with data fields that include PII. In this way, authorized views of data shared with the data service may be achieved. As shown in FIG. 2 by way of example, the results data 208 may provide an authorized view that correlates the customer token field from the first dataset 202 with the bucket field of the second dataset 204. Both the payment service and the service provider may be authorized to view this results data 208.

When the results data 208 is returned to the payment service (or partner), the data can be aggregated and anonymized such that neither the payment service nor the partner has access to PII that they did not previously have access to. Utilizing the example from FIG. 2, the email addresses from the two datasets are not sent to the payment service or the service provider. Instead, the data sent to the payment service and/or the service provider includes only the customer token and the bucket data. By enabling joining of datasets, the payment service can gain authorization to view data associated with the partner, for example, for targeting individual users with promotional offers (e.g., promotions, incentives, etc.) or the like. That is, by enabling joining of datasets, the payment service may apply user targeting without receiving emails (or hashes of emails) for customers that are not currently payment service customers, and the partner may receive information on the quantity of customers that are shared between the partner and the payment service without specifically identifying which customers are shared. In this example, the partner may decide that there are multiple styles or "buckets" of promotional offers, where the styles may indicate various degrees of value to the partner. These styles may be arbitrary, based on preferences of the partners, or omitted in certain examples.

When viewing query results, the partner may be presented with a percentage or other indication of the number of the partner's customers that are eligible for the promotional targeting. As a non-limiting example, from the results data 208 in FIG. 2, of five possible partner users, three are eligible for a promotion as indicated as Bucket A.

Figure 3:
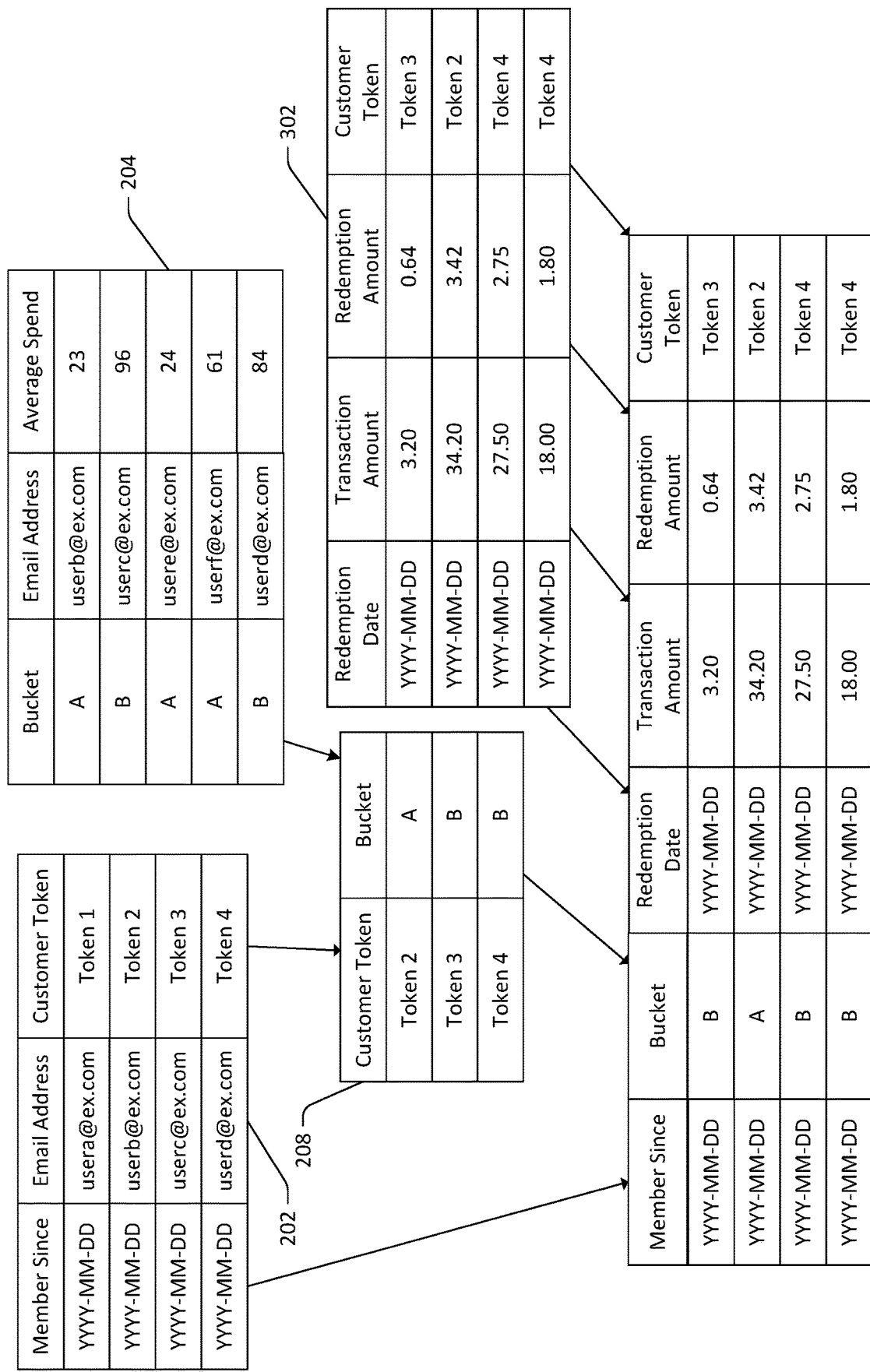
FIG. 3 is an example of datasets that may be utilized by a data service, including promotional redemption data, according to an embodiment described herein.

FIG. 3 is an example of datasets that may be utilized by a datastore, and including promotional redemption data, according to an embodiment described herein. FIG. 3 includes representations of three datasets: the first dataset 202 from FIG. 2, the second dataset 204 from FIG. 2, and a third dataset 302. These datasets may be provided by one or more of the payment service 104 and/or one or more service providers 103 as described with respect to FIG. 1.

As illustrated in FIG. 3, the first dataset 202 may be associated with payment service data and may include various data fields, including an email address, a member since field, and a customer token field. The second dataset 204 may be associated with a service provider and may include various data fields, including an email address, a buck field, and an average spend field. A common data field 206 may be identified as between the first dataset 202 and the second dataset 204 as described with respect to FIG. 2, and results data 208 may be generated. In this example, the results data 208 may then form the basis of yet another dataset that may be analyzed with respect to the first dataset 202, the second dataset 204, and/or the third dataset 302, with common fields being determined as between some or all of the datasets to generate additional results 304.

As shown in FIG. 3 by way of example, the data service may store the first dataset 202 and the results data 208. As such, the data service may correlate one or more of the common fields as between the first dataset 202 and the second dataset 204 (here illustrated as the bucket field) with one or more fields that are identified as PII (here illustrated as the member since field from the first dataset 202). Additionally, the data service may then utilize these portions of the first dataset 202 and the results data 208 to determine a common data field with the third dataset 302. In the example of FIG. 3, that common data field is the customer token field from the third dataset 302. Utilizing these common data fields, the additional results 304 may be generated that includes some data from the first dataset 202, the second dataset 204, the results data 208, and the third dataset 302. As such, the additional results 304 may correlate, in the example of FIG. 3, the member since field from the first dataset 202 with the bucket field from the second dataset 204 and with the redemption date field, the transaction amount field, and the redemption amount field from the third dataset 302. In this example, authorized views of data from the data service may be associated with the payment service and multiple service providers, where some data from the first dataset 202 is authorized to be viewed by both service providers, some data from the second dataset 204 is authorized to be viewed by the payment service and the other service provider, and some data from the third dataset 302 is authorized to be viewed by the payment service and the first service provider.

As such, in addition to targeting advertisements as described with respect to FIG. 2, attribution of results may also be determined. For example, during or after a promotional campaign, it may be important to expose results of the campaign to the service provider by the payment service. Knowing the specific individual who redeemed the promotion may be useful. However, knowing that a redemption itself took place can similarly be useful. With the addition of a promotional redemption dataset (the third dataset 302), a secondary view may be created that provides output indicating user bucketing or styling, redemption dates, transaction amounts, redemption amounts, customer tokens, member initiation indicators, or other information associated with the redemption such as indications of whether a promotion has been redeemed by a given user.

This promotional redemption dataset may be updated in real time, or near real time, to report on the success of the promotional campaign to the service provider. This view may be constructed in a way such that the payment service can report on email addresses or other identifying information that were not in the original joined dataset. If the user bucket for unknown customers is different, it may allow for identification of customers that were new to both the payment service and the partner.

In addition to the above, the payment service 104 may utilize the data from the query results to identify a particular user that was not in the original dataset, and the service provider(s) 103 may be presented with an indication that there was at least one new customer generated by the promotional campaign. The service provider(s) 103 can also see how many "high value" (e.g., with spending or engagement that meets or exceeds a threshold) bucket customers redeemed the promotional offer, as well as how many "low value" (e.g., with spending or engagement that is below a threshold) bucket customers redeemed the promotional offer.

Redemption time and transaction amount may also be important to a given service provider(s) 103. Examples of promotional redemption data as described herein may include a redemption date, a transaction amount, a redemption amount, and a customer token. The redemption data may indicate a date and time the promotional offer was redeemed. The transaction amount may indicate the total amount for the transaction before the promotional offer is applied. The redemption amount may indicate the amount that was applied to the promotion. The customer token may indicate an identifier of the customer that redeemed the promotional offer. Redemption data may be provided through the joined dataset, and this information may be used by the service provider(s) 103 to de-anonymize the data as the service provider(s) 103 may also have that information from the transaction data generated when users purchase goods and services from the service provider(s) 103.

To promote the security of the PII and other data provided to the data service 105, the party making a query or otherwise seeking to obtain an authorized view of given data that is utilized by the entities to retrieve the data from the data service may have access to the source data before it is reduced or joined as described herein. In these and other examples, the creator of a query may have the ability to read the source data via an "authorized view." In some examples, once a query has been created and a permission provisioned for generating a query response, the service provider 103 can revoke access to the payment service-controlled account, which can leave the generated (anonymized) query intact.

With respect to promotional campaign targeting and generation of queries as described herein, traditionally, hashed emails and device identifiers have been used for anonymizing personal data and then directly sharing this anonymized data between the payment service 104 and the service provider 103. To do so, a dataset held by the data service 105 that is not the payment service 104 or the service provider 103 is generated, as described above. The dataset may indicate specific information about customers associated with a promotional campaign, which may be restricted from systems other than the data service 105. This data may include customer tokens, email addresses or other identifying information, and an indicator of when the customer became associated with one or more of the systems. The dataset held by the data service 105 may also include promotional redemption data, as described above. Customer aliases may also be generated by the originating system (such as customer aliases of customers associated with the payment service 104, and customers associated with the service provider 103) and provided to the data service 105 for inclusion in the joined dataset. Reward information associated with the customer may also be generated by the originating system and provided to the data service 105 for inclusion in the joined dataset.

In at least one example, the payment service 104 can send the query to the data service 105 and, based at least in part on the service provider 103 provisioning a temporary viewing permission to the payment service 104, can receive a query result indicating (i) overlapping users between the payment service 104 and the service provider 103 and (ii) the eligible promotions for individual of the overlapping users, wherein the query result excludes personal identifiers stored by the data service 105. In at least one example, each of the eligible promotions can be presented to individual of the overlapping users via respective instances of a payment application, associated with the payment service 104, that is executing on respective user devices of the overlapping users.

While techniques described herein make reference to using aggregate views for identifying promotional opportunities and measuring the success of promotional campaigns, techniques described herein can be similarly applicable to any circumstance where data can be abstracted for informational purposes without exposing PII. Examples of alternative uses include identifying fraudulent users across multiple payment service or the like.

Figure 4:
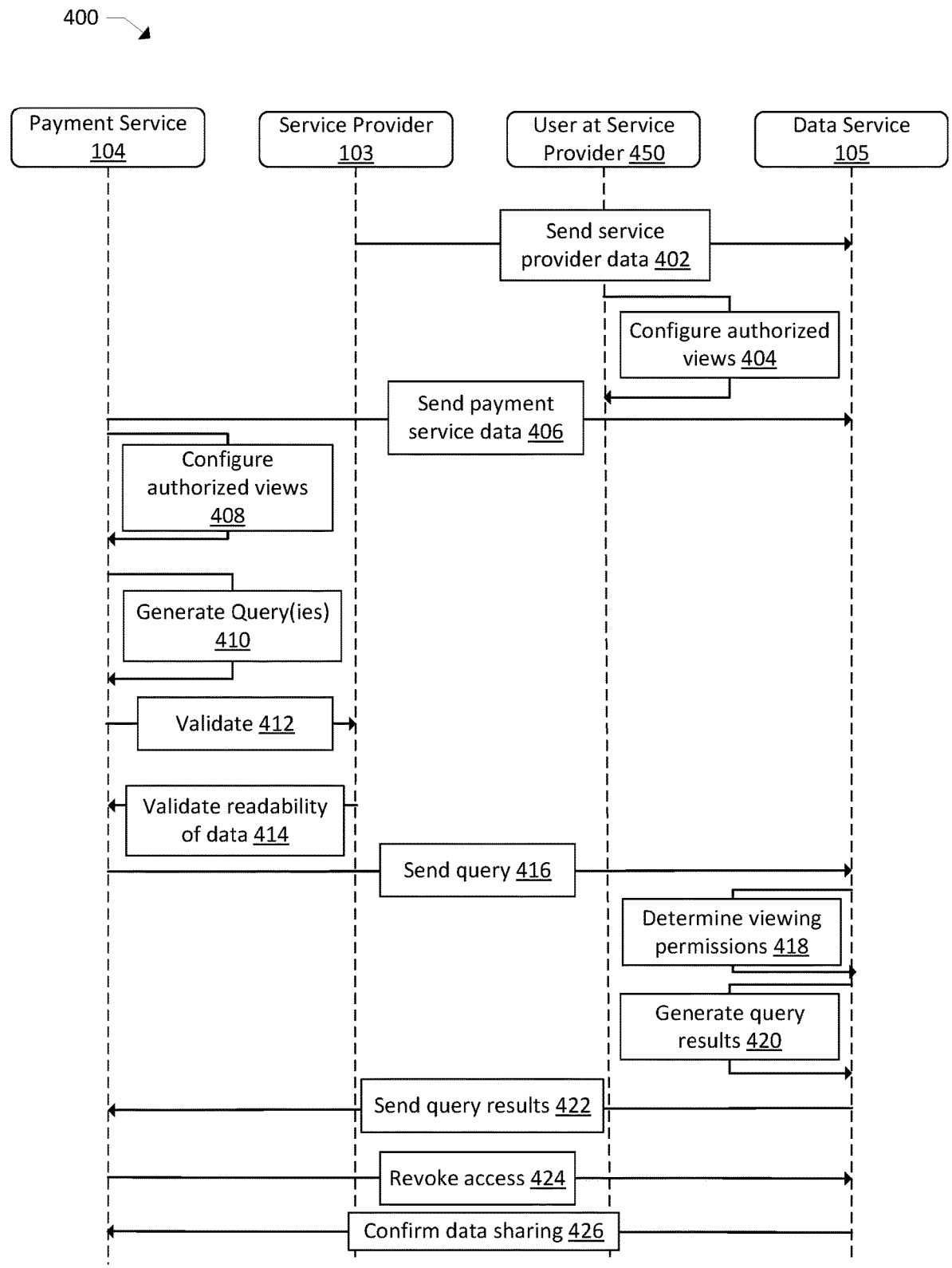
FIG. 4 is a sequence diagram of an example process associated with authorized views for privacy preservation, according to an embodiment described herein.

FIG. 4 is an example sequence diagram associated with authorized view enablement as described herein. The sequence diagram illustrates a process as a collection of blocks, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-3 and 5-14, although the processes may be implemented in a wide variety of other environments, architectures and systems.

FIG. 4 is a sequence diagram of an example process 400 associated with authorized views for privacy preservation, according to an embodiment described herein. It should be understood that the operations described with respect to FIG. 4 may be performed in orders other than those presented in the figure and/or some of the operations may be performed in parallel. One or more operations may be optional.

At block 402, a service provider 103 may send the service provider data to the data service 105 for storage. It should be understood that any time the sending or receiving of PII is mentioned herein, that sending or receiving of PII is performed when user consent for such sharing has been provided. The service provider data may be the data of the service provider 103 as formatted or otherwise obscured for the purpose of providing a dataset to the data service 105. Examples of service provider data may include an email address or other identifying information of users, a bucket identifier, and an average spend indicator. The email address or other identifying information may be similar to that described with respect to the dataset of the payment service 104. The bucket identifier may indicate which promotional value is to be applied to the customer. The average spend indicator may indicate spending trends or a spending value attributed to the customer. In some examples, service provider data can be generated based on data provided by users or customers of the service provider 103. In some examples, service provider data can be generated based on interactions of such users or customers with the service(s) offered by the service provider 103.

The service provider 103 can share the service provider data with the data service 105 for storage thereof. In some examples, the service provider data can be encrypted or otherwise stored securely by the data service 105. In some examples, the service provider data stored by the data service 105 can be fully controlled by the service provider 103. That is, the service provider 103 can be associated with a set of rules or permissions that enable the service provider to read, write, edit, delete, or otherwise control the service provider data stored on the data service 105. In some examples, the service provider data can be a "source dataset." In some examples, service provider data can be sent to the data service 105 in batches or can be provided in real-time or near-real-time (e.g., via streaming).

At block 404, the process 400 may include a user 450 at the service provider 103 configuring authorized views to service provider data stored by the data service 105. In at least one example, the user 450 can configure fields of the data, authorized viewers of the data, requested operations to be performed on the data, prohibited operations associated with the data, or any other attributes that may affect how the data is utilized by the data service 105 or another entity such as the payment service 104. That is, the user 450 can establish rules, permissions, or conditions associated with storing or enabling access to such service provider data. The rules, permissions, or conditions can be stored in association with the service provider data by the data service 105.

In at least one example, one or more of the rules, permissions, or conditions can be associated with enabling or restricting access to the dataset associated with the service provider 103 that is stored by the data service 105, as described herein. For example, the service provider 103 may set up limitations, guardrails, or otherwise provide qualified information access to the data service 105 for use of the data. In some examples, the rules, permissions, or conditions may indicate one or more data tables, columns, or data fields that are accessible. In at least one example, the service provider can configure an "authorized view," whereby another user (e.g., the payment service 104) is authorized to receive query results but is restricted from accessing the underlying service provider data stored by the data service 105. In some examples, an authorized view can be associated with a dataset that queries data in the "source dataset." This can enable separate parties (e.g., the service provider and another user) to create an aggregate view on data stored by the data service 105 that does not expose PII.

As described above with reference to block 402 and 404, the service provider 103 can create a dataset, send the dataset for storage by the data service 105, and create or apply access controls (e.g., rules, permissions, or conditions) to the dataset. As a result, the service provider 103 can have a first set of permissions for accessing or otherwise interacting with the dataset and one or more other users can have a second set of permissions for accessing or otherwise interacting with the dataset. The second set of permissions can be more restrictive than the first set of permissions such that the other users cannot access the entire dataset. For example, in some instances, the other users cannot access PII associated with the dataset. In some examples, such access provided to other users can be temporarily provisioned such that upon satisfaction of a condition (e.g., access to the dataset, a portion of the dataset being provided to another user, lapse of time, etc.), such access is terminated.

At block 406, the process 400 may include the payment service 104 sending payment service data to the data service 105. It should be understood that any time the sending or receiving of PII is mentioned herein, that sending or receiving of PII is performed when user consent for such sharing has been provided. The payment service data may be the data of the payment service 104 as formatted or otherwise obscured for the purpose of providing a dataset to the data service 105. An example of data that may be available to the payment service 104 may include a customer token, an email address or other user identifier, and an indicator of when the user became associated with the payment service 104, for example. The customer token may be utilized for targeting and may include a unique identifier of the user with respect to the payment service 104. The email address or other user identifier may be utilized for targeting and attribution, and may be considered PII. The indicator of when the user became associated with the payment service 104 may be utilized for attribution. In some examples, payment service data can be generated based on data provided by users or customers of the payment service 104. In some examples, payment service data can be generated based on interactions of such users or customers with the service(s) offered by the payment service 104.

The payment service 104 can share the payment service data with the data service 105 for storage thereof. In some examples, the payment service data can be encrypted or otherwise stored securely by the data service 105. In some examples, the payment service data stored by the data service 105 can be fully controlled by the payment service 104. That is, the payment service 104 can be associated with a set of rules or permissions that enable the payment service 104 to read, write, edit, delete, or otherwise control the service provider data stored by the data service 105. This dataset can be a "source dataset" for the payment service 104. In some examples, payment service data can be sent to the data service 105 in batches or can be provided in real-time or near-real-time (e.g., via streaming).

At block 408, the process 400 may include configuring authorized views to the payment service data stored by the data service 105. In at least one example, the payment service 104 can configure authorized views to the payment service data in the same or a similar manner as described above with respect to block 404.

In at least one example, like the service provider 103, the payment service 104, can configure an "authorized view," whereby another user (e.g., the service provider 103) may be authorized to receive query results but is restricted from accessing the underlying payment service data stored by the data service 105. In some examples, an authorized view can be associated with a dataset that queries data in the "source dataset." This can enable separate parties (e.g., the payment service 104 and another user) to create an aggregate view on data stored by the data service 105 that does not expose PII.

As described above with reference to block 406 and 408, the payment service 104 can create a dataset, send the dataset for storage by the data service 105, and create or apply access controls (e.g., rules, permissions, or conditions) to the dataset. As a result, the payment service 104 can have a first set of permissions for accessing or otherwise interacting with the dataset and one or more other users can have a second set of permissions for accessing or otherwise interacting with the dataset. The second set of permissions can be more restrictive than the first set of permissions such that the other users cannot access the entire dataset. For example, in some instances, the other users cannot access PII associated with the dataset. In some examples, such access provided to other users can be temporarily provisioned such that upon satisfaction of a condition (e.g., access to the dataset, a portion of the dataset being provided to another user, lapse of time, etc.), such access is terminated.

At block 410, the process 400 may include the payment service 104 generating one or more queries. A query may establish what information is to be provided by the data service 105 to the payment service 104. That is, in at least one example, the query can specify one or more query attributes, such as which fields of data to access.

At block 412, which can be optional, the process 400 may include the payment service 104 performing a validation operation with the service provider 103. This validation may include the payment service 104 and the service provider 103 communicating with each other directly to ensure that the query in question as well as the datasets are acceptable to both entities and that security measures have been taken to the satisfaction of both entities.

At block 414, which can be optional, the process 400 may include the service provider 103 validating readability of the data associated with the payment service 104. For example, given the various forms of data and formatting of such data across service providers 103 and as between service providers 103 and the payment service 104, the service provider 103 may determine whether the query will be supported by the service provider 103 or that the service provider 103 will otherwise be able to access particular data, such as promotional redemption data from the data service 105.

At block 416, the process 400 may include the payment service 104 sending a query to the data service 105. The data service 105 can utilize rules, permissions, or conditions associated with each dataset with which the query, and the query attributes, is associated to determine which data to return in response to the query. In some examples, the data service 105 can map data held by the service provider 103 with the data from the data service 105. In at least one example, such mapping can enable generating an aggregation of data associated with the payment service 104 and the service provider 103. In some examples, such aggregated data can omit or otherwise exclude PII data associated with the payment service dataset and the service provider dataset. That is, in some examples, the query result can represent an abstraction of the dataset associated with the service provider 103 and the dataset associated with the payment service 104, based on the one or more attributes of the query, and can exclude any PII associated with the dataset associated with the service provider 103 and the dataset associated with the payment service 104.

At block 418, the process 400 may include the data service 105 determining viewing permissions associated with the payment service 104 and the service provider 103. For example, viewing privileges may be temporal in nature or otherwise may be provided for a limited time. In examples, one or more triggers and/or conditions may be associated with the temporary privileges, and when the triggers and/or the conditions occur, the privileges may be revoked and/or changed. For example, the payment service 104 may grant a temporary reading privilege to the service providers 103 for certain data from the payment service 104 and held by the data service 105. The triggers and/or conditions may include, for example, when the service providers 103 receives requested data about the payment service 104 from the data service 105, after a certain amount of time lapses from when the payment service 104 sent the data in question, when an attribute associated with the service providers 103 changes (such if the service providers 103 revokes a temporary privilege that the service providers 103 had granted, and the like. It should be understood that these triggers and/or conditions are provided by way of example and the granting, revocation, and changing of privileges by the payment service 104 and/or the service providers 103 may be customizable, configurable, and include other triggers and/or conditions.

At block 420, the process 400 may include generating query results. For example, the data service 105 may generate query results to be returned to the payment service 104. To do so, the data service 105 may utilize the query along with a first dataset associated with the payment service 104 and a second dataset associated with the service provider 103 to first determine a joinable field as between the two datasets. A joinable field may be any data field that is common as between the datasets at issue. By way of example, the first dataset from the payment service 104 may include a customer identifier field as maintained by the payment service 104, an email field, a credit card number field, a transaction date field, a transaction amount field, and the like. The second dataset from the service provider 103 may include a different customer identifier field as maintained by the payment service 104, an email field, a loyalty rewards number field, a loyalty rewards points field, and the like. In this example, the email field is common as between the two datasets and can be used by the results generator to correlate user data from the first dataset with user data from the second dataset.

At block 426, the data service 105 may send the query results to the requesting entity, here the payment service 104. The query results may be sent as described in more detail herein, but generally the query results may include at least a portion of the data from the service provider 103, which may be abstracted in instances where the data includes PII.

At block 424, the process 400 may include the payment service 104 revoking access with respect to the data service 105. For example, once the data in question is obtained by the payment service 104, in response to the query, the data need not be accessible to the payment service 104 thereafter, in examples. As such, access to the data may be revoked by the service provider 103 or the data service 105. In some examples, a similar revocation can be executed for payment service data provided to the service provider 103. In some examples, access can be revoked or otherwise terminated based at least in part on a determination that a condition is satisfied. Such a condition can correspond to access having been granted, data having been provided, a period of time having lapsed, or the like.

At block 426, which can be optional, the process 400 may include the data service 105 sending a confirmation to the payment service 104. For example, a confirmation may be sent indicating that the service provider 103 was able to acquire the redemption data, targeting data, or other data associated with the query from the data service 105.

While FIG. 4 illustrates a process where the payment service 104 is requesting access to data stored by the data service 105, in additional or alternative examples, the service provider 103 can request access to data stored by the data service 105. In both examples, the data service 105 can implement temporary viewing permissions (e.g., authorized views) to enable the requesting party to view data associated with the other party, wherein at least some data (e.g., PII) is withheld for privacy or security purposes.

Figure 5:
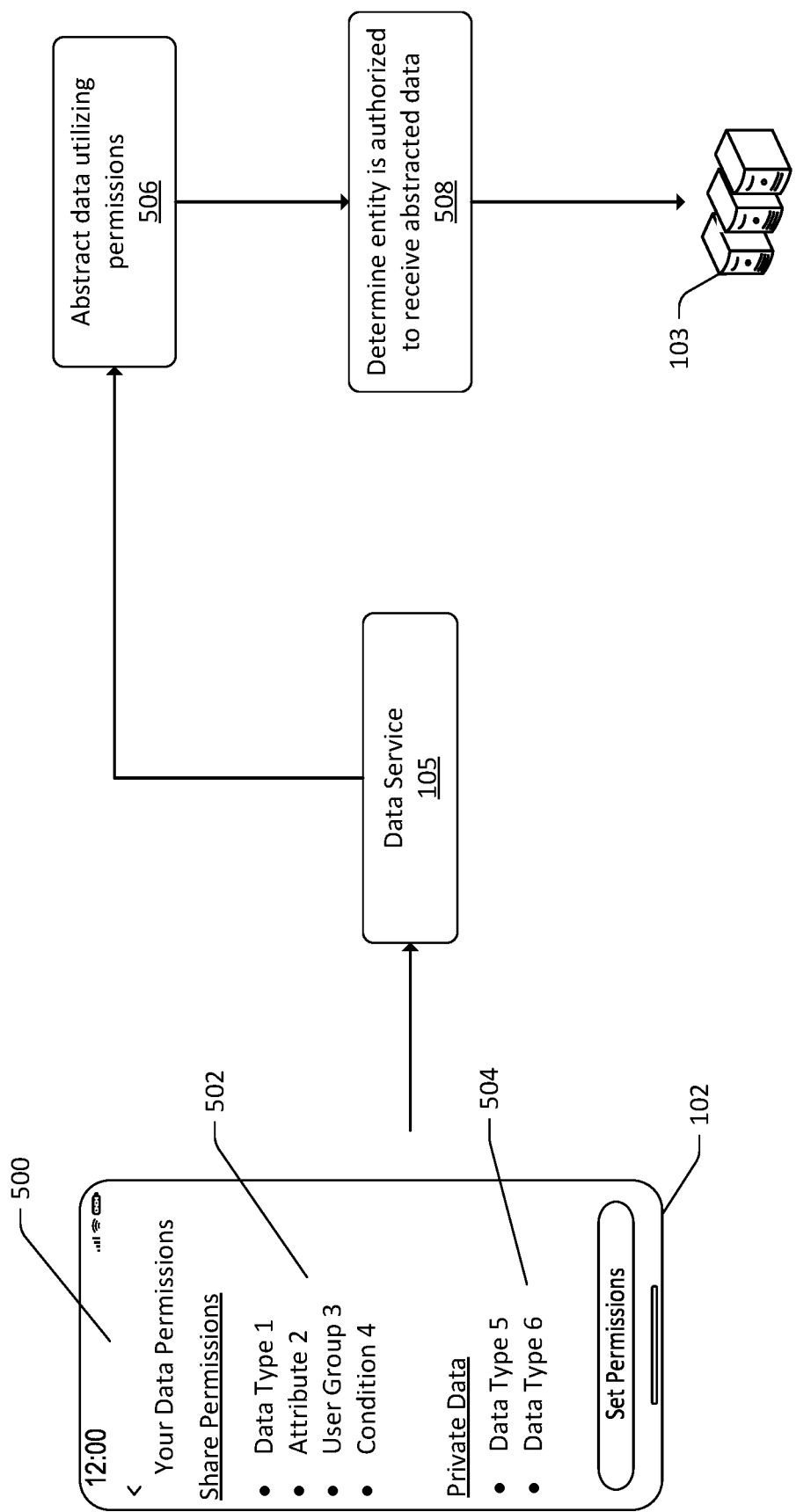
FIG. 5 is an example user interface for selecting permissions associated with authorized views of personal data as well as how a data service may utilize the permissions to share data between entities, according to an embodiment described herein.

FIG. 5 is an example user interface 500 for selecting permissions associated with authorized views of personal data as well as how a data service may utilize the permissions to share data between entities, according to an embodiment described herein. FIG. 5 depicts a user device 102, which may be the same or similar to the user device 102 described with respect to FIG. 1. The user device 102 may be associated with the payment service 104 and/or one or more of the service providers described with respect to FIG. 1. FIG. 5 also depicts the data service 105, which may be the same or similar to the data service described with respect to FIG. 1.

The user interface 500 may be configured to display information and options for selecting and/or setting permissions for data usage by the data service 105 and/or one or more other entities such as service providers 103. The permissions component 142 as described with respect to FIG. 1 may be utilized to receive user input data provided via the user interface 500 and to generate data indicating the permissions affiliated with that user input data. As shown in FIG. 5, the user interface 500 may include a share permissions field 502, which may indicate options for selecting attributes of data to be shared with other entities, such as service providers 103. In the example of FIG. 5, the user input data received via the user interface 500 indicates that the share permissions field 502 includes indicators that data of Data Type 1, data having Attribute 2, data associated with User Group 3, and data associated with Condition 4 are indicated as being permitted to be shared. Data Type 1 may be any data type associated with data stored by the entity in question. While many data types are provided throughout this disclosure, some example data types may be user name, user address, email address, telephone number, transaction information, loyalty number, metadata tag identifiers, redemption information, etc. The attributes, such as Attribute 2, may be any attribute of the data in question. Just by way of example, the attributes may include a data file size, a creation date of the data, an indicator of an application that generated the data, an association of the data with other entities, etc. The user groups, such as User Group 3, may be any user grouping indicator as stored by the payment service 104 and/or one or more other applications, including, for example, social media applications. The conditions, such as Condition 4, may be any condition that the user, the payment service, and/or another device may put on sharing of the data. Example conditions may include that reciprocal data sharing is enabled by the service provider in question, that permissions be revoked upon sending of the data, that the data is abstracted at least in part before sending, etc.

The user interface 500 may also include a private data field 504. The private data field 504 may indicate one or more data types that are specifically indicated as private and that should thus be treated as PII and not to be shared by the data service 105. As shown in FIG. 5 by way of example, Data Type 5 and Data Type 6 are specifically noted in the private data field 504 and are to be treated as PII by the data service 105. By allowing for the private data field 504 to be utilized, guardrails or otherwise safeguards may be put in place in case the share permissions that are granted would subsume data of the type that the payment service or another entity would not want shared.

The permissions component 142 of the payment service 104 may generate data indicating these permissions, and the privileges component 154 of the data service 105 may utilize this data to determine rules, attributes, and/or conditions to be applied to datasets received from the payment service 104. As an example, from FIG. 5, a query for data may be received from a service provider 103 for the dataset sent from the payment service 104. The rules, attributes, and/or conditions may be identified for the dataset and utilized to determine at least some of the data in the dataset is authorized for sending.

In examples where the privileges component 154 determines that at least a portion of the data in the dataset is to be abstracted before sending, at block 506 from FIG. 5, an abstraction component 156 of the data service 105 may abstract the data at issue. Additional details on the abstraction component 156 are provided above with respect to FIG. 1. Thereafter, at block 508 from FIG. 5, the data service 105 may determine whether the entity that requested the data (here the service provider 103) is authorized to receive the abstracted data. The rules, attributes, and/or conditions described above may be utilized to make this determination. When authorized, the abstracted data may be sent from the data service 105 to the service provider 103. It should be understood that any time the sending or receiving of PII is mentioned herein, that sending or receiving of PII is performed when user consent for such sharing has been provided.

Figure 6:
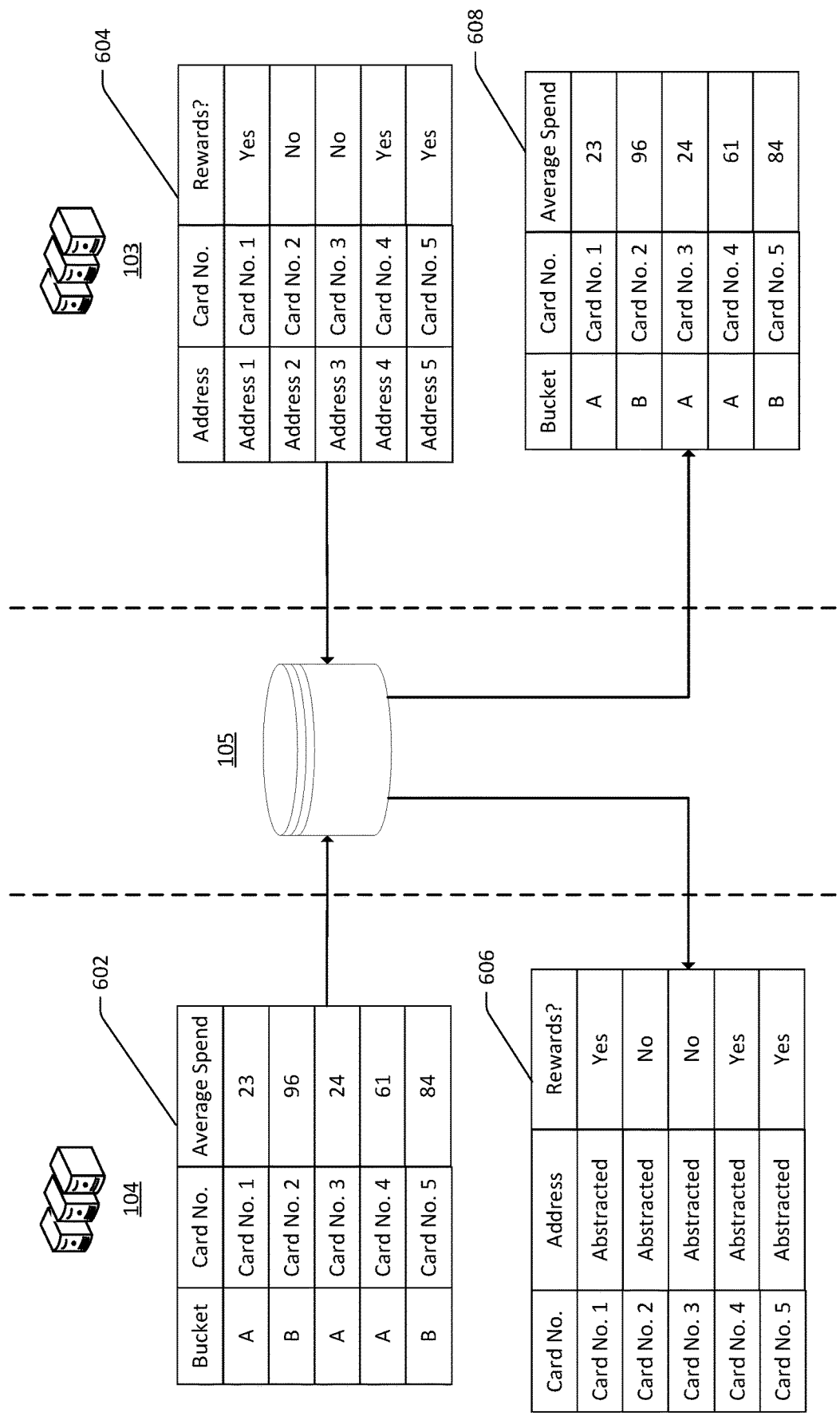
FIG. 6 is a conceptual diagram showing example datasets that may be accessed by a data service to allow for authorized views while preserving privacy, according to an embodiment described herein.

FIG. 6 is a conceptual diagram showing example datasets that may be accessed by a data service to allow for authorized views while preserving privacy, according to an embodiment described herein. As shown in FIG. 6, the environment in question may include the payment service 104, a given service provider 103, and the data service 105. Interactions and data to and from each of these systems is described below by way of example.

Starting with the payment service 104 (though the operations associated with the service provider 103 could be performed first and/or in parallel with those performed in association with the payment service 104), the payment service 104 may send a payment service dataset 602 to the data service 105. It should be understood that any time the sending or receiving of PII is mentioned herein, that sending or receiving of PII is performed when user consent for such sharing has been provided. While the payment service dataset 602 may include any data, the example provided in FIG. 6 includes data for user buckets, card numbers, and average spend associated with users. This payment service dataset 602 may be stored by the data service 105 along with permissions data received from the payment service 104 that indicates rules, attributes, and/or conditions to be applied for the sharing of data in the payment service dataset 602.

The same or a similar process may be performed in association with the service provider 103. Specifically, the service provider 103 may send a service provider dataset 604 to the data service 105. It should be understood that any time the sending or receiving of PII is mentioned herein, that sending or receiving of PII is performed when user consent for such sharing has been provided. While the service provider dataset 604 may include any data, the example provided in FIG. 6 includes data for addresses, card numbers, and a rewards indicator. This service provider dataset 604 may be stored by the data service 105 along with permissions data received from the service provider 103 that indicates rules, attributes, and/or conditions to be applied for the sharing of data in the service provider dataset 604.

Thereafter, the payment service 104 and/or the service provider 103 may send queries to the data service 105 requesting data associated with the other entity. Assuming that the rules, attributes, and/or conditions as set by the payment service 104 and/or the service provider 103 allow for data sharing, a common data field may be identified and utilized to correlate the payment service dataset 602 and the service provider dataset 604. In the example of FIG. 6, the common data field is the card number field. Query results may be generated by the data service 105 and may be abstracted in examples where abstraction is required in light of the data including PII and/or based at least in part on the rules, attributes, and/or conditions.

As shown in FIG. 6, the first results 606 sent to the payment service 104 in response to a request from the payment service 104 may include the card numbers associated with users that are common as between the payment service 104 and the service provider 103 as well as data associated with user addresses and the rewards indicators as provided by the service provider 103. However, as noted in the first results 606, the address information has been abstracted such that the email and/or physical addresses of the users are not provided to the payment service 104 but instead a version of the addresses and/or a portion of the addresses are received. This may not allow the payment service 104 to utilize the address information to contact the users because the information is abstracted and/or incomplete, but it may still allow the payment service 104 to identify the user in question by the abstracted address and to compare the abstracted address information to address information already known to the payment service 104.

Additionally, the second results 608 sent to the service provider 103 in response to a query from the service provider 103 may include the bucket data and average spend data from the payment service 104 as correlated to the card numbers common between the entities. In this example, data abstraction is not performed because the bucket data and/or average spend data is determined to not contain PII or otherwise contain information that was indicated by the payment service 104 as private.

Figure 7:
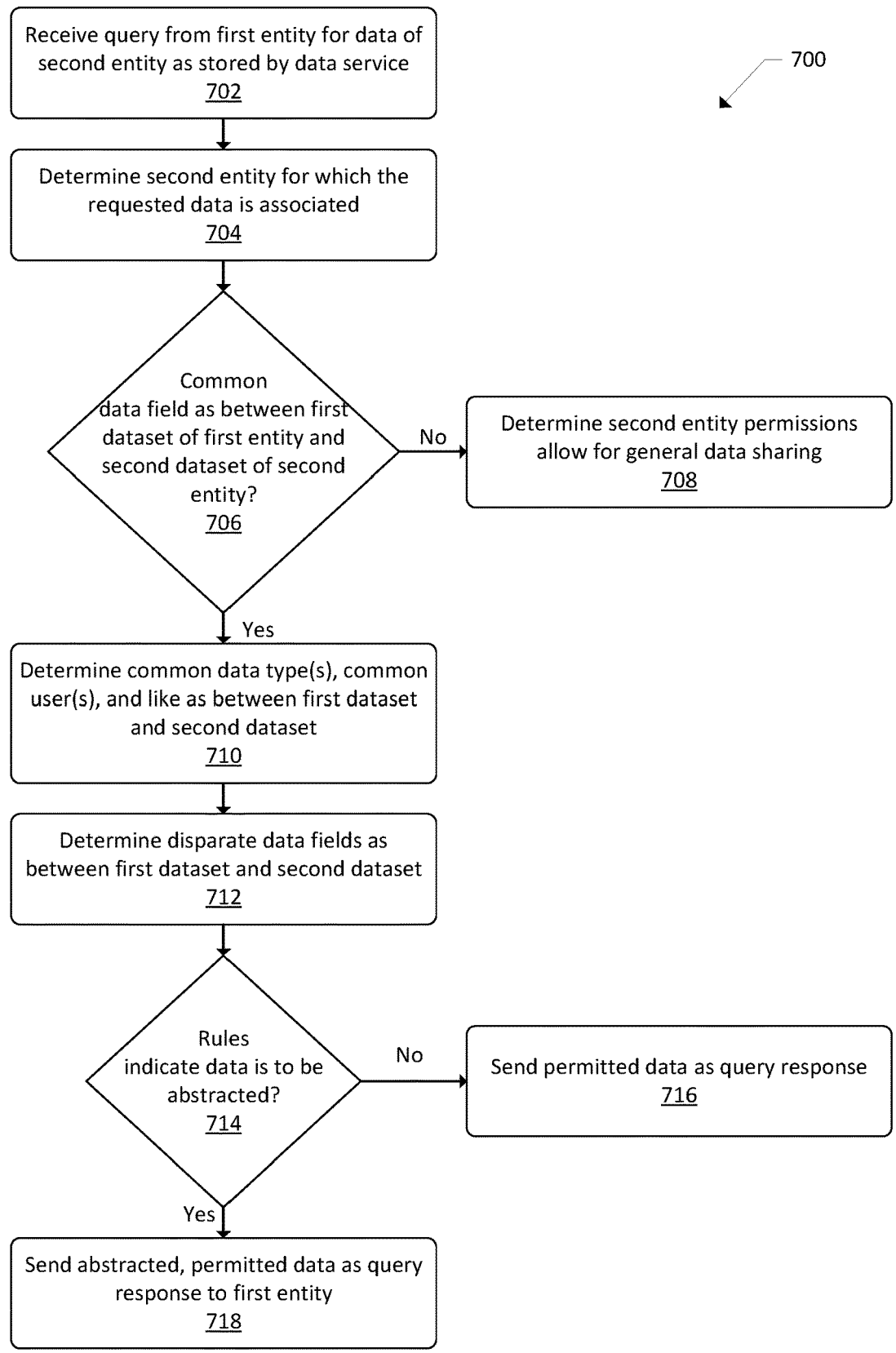
FIG. 7 is a flow diagram of an example process for determining common data fields between datasets and abstracting personal data prior to sharing thereof, according to an embodiment described herein.
Figure 8:
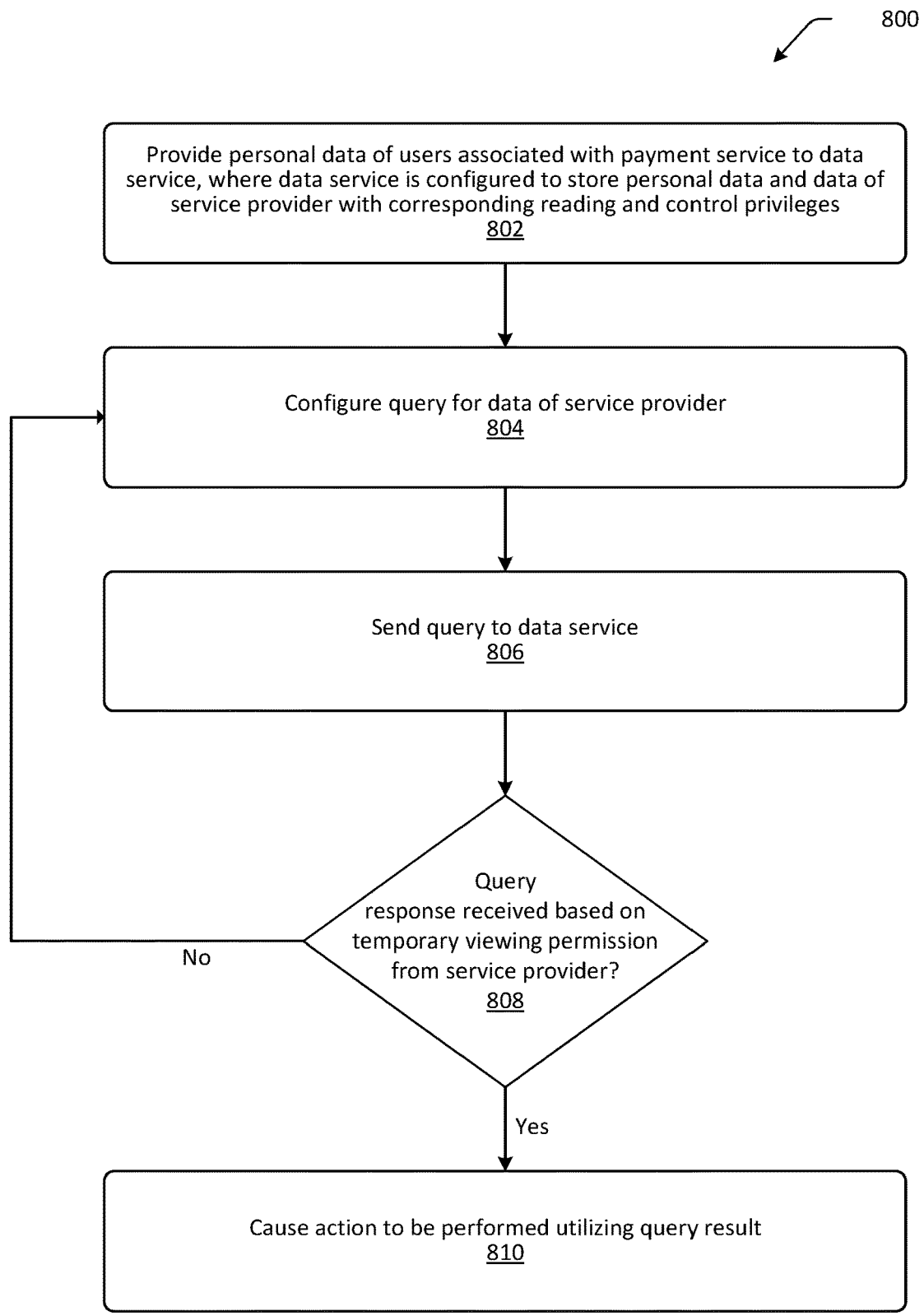
FIG. 8 is a flow diagram of an example process for sharing data between a payment service and a service provider utilizing a data service, according to an embodiment described herein.
Figure 9:
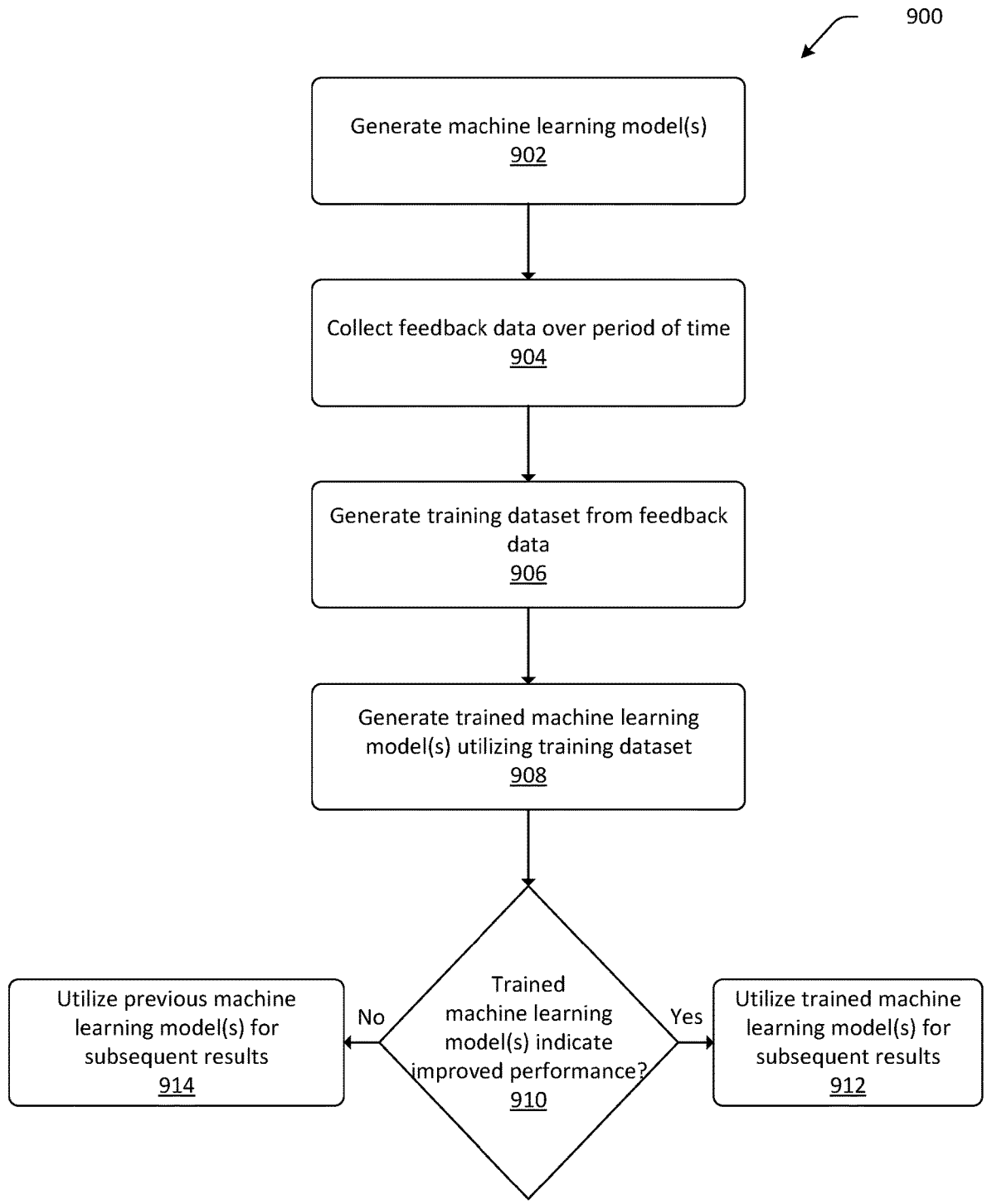
FIG. 9 is a flow diagram of an example process for generating and/or training machine learning models to perform one or more of the processes described herein, according to an embodiment described herein.

FIGS. 7-9 are example processes associated with authorized view enablement as described herein. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-6 and 10-14, although the processes may be implemented in a wide variety of other environments, architectures and systems.

FIG. 7 is a flow diagram of an example process 700 for determining common data fields between datasets and abstracting personal data prior to sharing thereof, according to an embodiment described herein. The order in which the operations or steps are described is not intended to be construed as a limitation, and any number of the described operations may be combined in any order and/or in parallel to implement process 700. One or more operations may be optional.

At block 702, the process 700 may include receiving a query from a first entity for data of a second entity as stored by a data service. For example, the first entity (which may be a payment service such as the payment service 104 from in FIG. 1) may send a query to a data service (which may be the data service 105 from FIG. 1) for data associated with one or more service providers (which may be the service providers 103 from FIG. 1). To do so, a query component of the payment service may generate a query that indicates one or more attributes of data that is requested from the data service. The one or more attributes may include data types, indicators of users associated with the requested data, time periods associated with the requested data, service providers from which the requested data was received, and the like. The query component may generate the query and may send data representing the query to the data service. An orchestrator of the data service may receive the query and may determine how to process the query in order to provide results in response to the query.

At block 704, the process 700 may include determining a second entity for which the requested data is associated. For example, the orchestrator of the data service may receive the query and analyze the query to determine an entity identifier of the second entity included in the query. In some examples, the entity identifier of the second entity may not be present in the query and/or may be present in a manner that is not usable by the data service. In these examples, other attributes of the query such as an identifier of the first entity, the types of requested data, etc. may be utilized to infer the second entity identifier.

At block 706, the process 700 may include determining whether a common data field is present as between a dataset associated with the first entity as stored by the data service and a dataset associated with the second entity as stored by the data service. The first entity may have stored data in association with the data service and the second entity may have stored data in association with the data service. In these examples, each of the datasets can have one or more common data fields, which can enable data analysis on the datasets in a manner that does not expose PII to external service providers (e.g., service providers other than the service provider with whom the PII is associated). For example, since at least one common data field, such as an email address of users, may be present for two datasets, this common data field may be utilized to "join" the datasets.

In examples where a common data field is not present as between the two datasets, the process 700 may include, at block 708, determining if second entity permissions allow for general data sharing with the first entity. In this example, a common data field is not available to be utilized by the data service to correlate data as between the two datasets at issue. But, if the permissions of the second entity allow for data to be shared with the first entity without such a correlation being made, and in a manner that likely would include some PII, then the data may still be shared with the first entity and may include PII. In these examples, data encryption schemes may be utilized to mitigate the ability of an entity other than the first entity from gaining access to the shared data.

In examples where a common data field is present as between the two datasets, the process 700 may include, at block 710, determining one or more common data types, one or more common users, and the like as between the first dataset and the second dataset. For example, there may be a single common data field as between the two datasets at issue, such as an email address of users of the payment service and the service provider. However, in other examples, there may be multiple common data fields each associated with their own common data types, such as email addresses, customer identifiers, phone numbers, credit card numbers, etc. Additionally, using the common data fields, a group of common users as between the payment service and the service provider at issue may be determined. In other words, there may be a set of users on which data is stored for the payment service and another set of users on which data is stored for the service provider, and some of the users of each entity may be the same. This group of common users may be identified utilizing the common data field(s) as described herein.

At block 712, the process 700 may include determining disparate data fields associated with the two datasets. For example, while the datasets may include one or more common data fields, the two datasets may also include disparate data fields or otherwise may include data that the other dataset does not. By way of example, the first dataset may include an average spend field while the second dataset may not include an average spend field but may include a redemption amount field (which is not included in the first dataset). These disparate data fields may be identified as being potentially sharable with the first entity in response to the query.

At block 714, the process 700 may include determining whether one or more rules associated with the sharing of data indicate that at least a portion of the data is to be abstracted. For example, data identified to be shared with the first entity may be associated with a restriction or other prohibition on sharing, such as, personal data (PII) or the like. For example, a restriction on sharing of data may be that PII and/or other data types indicated as being not permitted to be shared are to be abstracted from the data sent to the requesting party. To do so, an abstraction component of the data service may receive an indication of the data to be abstracted and may perform one or more processes to generate a version of the data in question in an abstracted form. The abstraction may include, for example, removing the data in question from the query result, redacting the data to be sent, hashing the data to be sent, vectorizing the data to be sent, and the like. By so doing, the abstraction component may be configured to generate query results that includes the requested data with at least a portion of that data abstracted from view or use by the requesting party and/or other entities.

In examples where the data in question is not associated with a restriction or other prohibition on sharing, such as personal data, the process 700 may include, at block 716, sending permitted data to the first entity in response to the query. For example, the results data sent to the first entity may include the data from the disparate data fields to the extent that data was requested in the query. The results data may also include at least a portion of correlated data that was sent to the data service from the first entity. This portion of the correlated data may be used by the first entity to correlate the disparate data with other data field know to the first entity but that may include PII and thus may not be sent with the query results. It should be understood that any time the sending or receiving of PII is mentioned herein, that sending or receiving of PII is performed when user consent for such sharing has been provided.

In examples where the data in question includes data that is associated with a restriction or other prohibition on sharing, such as personal data, the process 700 may include, at block 718, sending abstracted, permitted data to the first entity in response to the query. This process may be performed in the same or a similar manner as described with respect to block 716, except that at least a portion of the query results may be sent in an abstracted form. It should be understood that any time the sending or receiving of PII is mentioned herein, that sending or receiving of PII is performed when user consent for such sharing has been provided.

FIG. 8 is a flow diagram of an example process 800 for sharing data between a payment service and a service provider utilizing a data service, according to an embodiment described herein. The order in which the operations or steps are described is not intended to be construed as a limitation, and any number of the described operations may be combined in any order and/or in parallel to implement process 800. One or more operations may be optional.

At block 802, the process 800 may include providing personal data of users associated with a payment service to a data service, where the data service is configured to store the personal data and data of a service provider with corresponding reading and control privileges. For example, a payment service may collect and/or generate data associated with users of the payment service over a period of time and that data may be sent to the data service for storage by the data service. The data may include at least some personal data, otherwise described herein as PII. Many examples of PII are provided herein, but generally may include any information that could be utilized to identifier the users. It should be understood that any time the sending or receiving of PII is mentioned herein, that sending or receiving of PII is performed when user consent for such sharing has been provided.

At block 804, the process 800 may include configuring a query for data of a service provider. For example, a query component of the payment service may generate a query that indicates one or more attributes of data (of the service provider) that is requested from the data service. The one or more attributes may include data types, indicators of users associated with the requested data, time periods associated with the requested data, the service provider from which the requested data was received, and the like.

At block 806, the process 800 may include sending the query to the data service. For example, the query component may generate the query and may send data representing the query to the data service. In some examples, the query may be sent on its own without underlying data from the payment service. In other examples, the query may be accompanied by a dataset from the payment service that is to be utilized for determining a common data field as described in more detail above with respect to FIG. 1.

At block 808, the process 800 may include determining whether a query response has been received based on temporary viewing permission (e.g., "authorized view") from the service provider. For example, the data service may perform operations to generate query results in response to the query from the payment service. Examples of the processes performed by the data service to do so are described on more detail with respect to FIG. 7. When the query is sent to the data service, the payment service may be configured to periodically check if a query response has been received from the data service. In some examples, a response is received in the form of query results. In other examples, a response may be received but the response is not query results but instead an indication that the query could not be fulfilled and, in examples, a reason for the lack of fulfillment. Such reasons may be that an authorized view of the requested data was not provisioned by the service provider in question and/or that one or more errors occurred.

In examples where the query response has not been received, the process 800 may return to block 804 where a different query may be configured for sending to the data service and/or the process 800 may end. For example, the query response may identify an error with the query, a temporary error on the part of the data service, and/or an indication that permissions from the service provider do not allow for disclosure of all of the requested data. In these examples, the query may be reconfigured to mitigate the noted errors and/or to hone the request for data to data that is permitted. In other examples, a subsequent query may not be generated and the process may end without data of the service provider being shared with the payment service.

In still other examples, the query response may indicate a condition to be satisfied by the payment service before the requested data may be sent from the data service. The condition may be determined from input data received from the service provider and may be any of the conditions described above with respect to FIG. 1. In these examples, the payment service may send data indicating satisfaction of the condition to the data service, which may receive the indication and cause the requested data to be sent to the payment service in response to the condition being satisfied.

In examples where the query response has been received, the process 800 may include, at block 810, causing an action to be performed utilizing the query result. For example, the payment service may receive the query results and an actions component of the payment service may determine one or more actions to be performed with the received data. The actions may be any actions that the payment service is configured to perform. But by way of example, the actions may include updating user accounts of users of the payment service to include the data received from the data service. The actions may also include utilizing the received data to populate and/or auto-populate fields of a transaction (such as a customer to merchant transaction and/or a peer to peer transaction). The actions may also include applying and/or offering an incentive to a given user based at least in part on the data received from the data service. The actions may also include targeting a marketing campaign to the user based at least in part on the data received from the data service. In some examples, the payment service may send one or more commands to a user device to cause the user device to perform the one or more actions. In this example, the actions may include causing a payment application to be enabled, to move to a foreground of the user device, and to display information and/or functionality such as interactive links for the user.

FIG. 9 is a flow diagram of an example process 900 for the generation and training of machine learning models to perform one or more of the processes described herein, according to an embodiment described herein. The order in which the operations or steps are described is not intended to be construed as a limitation, and any number of the described operations may be combined in any order and/or in parallel to implement process 900.

At block 902, the process 900 may include generating one or more machine learning models. For example, the machine learning models may utilize predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the layers and/or models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases, such as the datastore (s) 130, and may be utilized to predict trends and behavior patterns. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter predictive modelling may be performed to generate accurate predictive models.

At block 904, the process 900 may include collecting feedback data over a period of time. The feedback data may include any of the data described with respect to the datastore(s) 130, any data associated with authorized views described herein, any data described with respect to FIGS. 1-8, or any other data that may be utilized to perform the operations described herein. This information may include factors associated with determining recommended data types to be shared as between the payment service and one or more service providers described herein, determining recommended data types that are PII and/or that may be utilized in connection with other data types to reveal PII about users, determining what information and/or portions of information should be abstracted prior to sending to a requesting party, and/or determining joinable fields as between datasets, just by way of example.

At block 906, the process 900 may include generating a training dataset from the feedback data. Generation of the training dataset may include formatting the feedback data into input vectors for the machine learning model to intake, as well as associating the various data with the outcomes of the processes described herein.

At block 908, the process 900 may include generating one or more trained machine learning models utilizing the training dataset. Generation of the trained machine learning models may include updating parameters and/or weightings and/or thresholds utilized by the models to determine recommended data types to be shared as between the payment service and one or more service providers, to determine recommended data types that are PII and/or that may be utilized in connection with other data types to reveal PII about users, to determine what information and/or portions of information should be abstracted prior to sending to a requesting party, and/or to determine joinable fields as between datasets, just by way of example.

At block 910, the process 900 may include determining whether the trained machine learning models indicate improved performance metrics. For example, a testing group may be generated where the outcomes of the image analyses are known but not to the trained machine learning models. The trained machine learning models may generate results, which may be compared to the known results to determine whether the results of the trained machine learning model produce a superior result than the results of the machine learning model prior to training.

In examples where the trained machine learning models indicate improved performance metrics, the process 900 may include, at block 912, utilizing the trained machine learning models for generating subsequent results. For example, the trained machine learning models may be utilized to determine the number and/or types of perspectives to instruct the user to acquire of the payment instrument, determine the risk metrics described herein, determine whether to generate a 3D model of the payment instrument, determine how to generate the 3D model, identify objects and/or text portions of the payment instrument, perform the comparison as between acquired payment instrument information and stored reference payment instrument information, determine the similarity thresholds described herein, detect fraudulent activity, etc. It should be understood that the trained machine learning models may be utilized in any scenario where models are utilized as described herein.

In examples where the trained machine learning models do not indicate improved performance metrics, the process 900 may include, at block 914, utilizing the previous iteration of the machine learning models for generating subsequent results.

Figure 10:
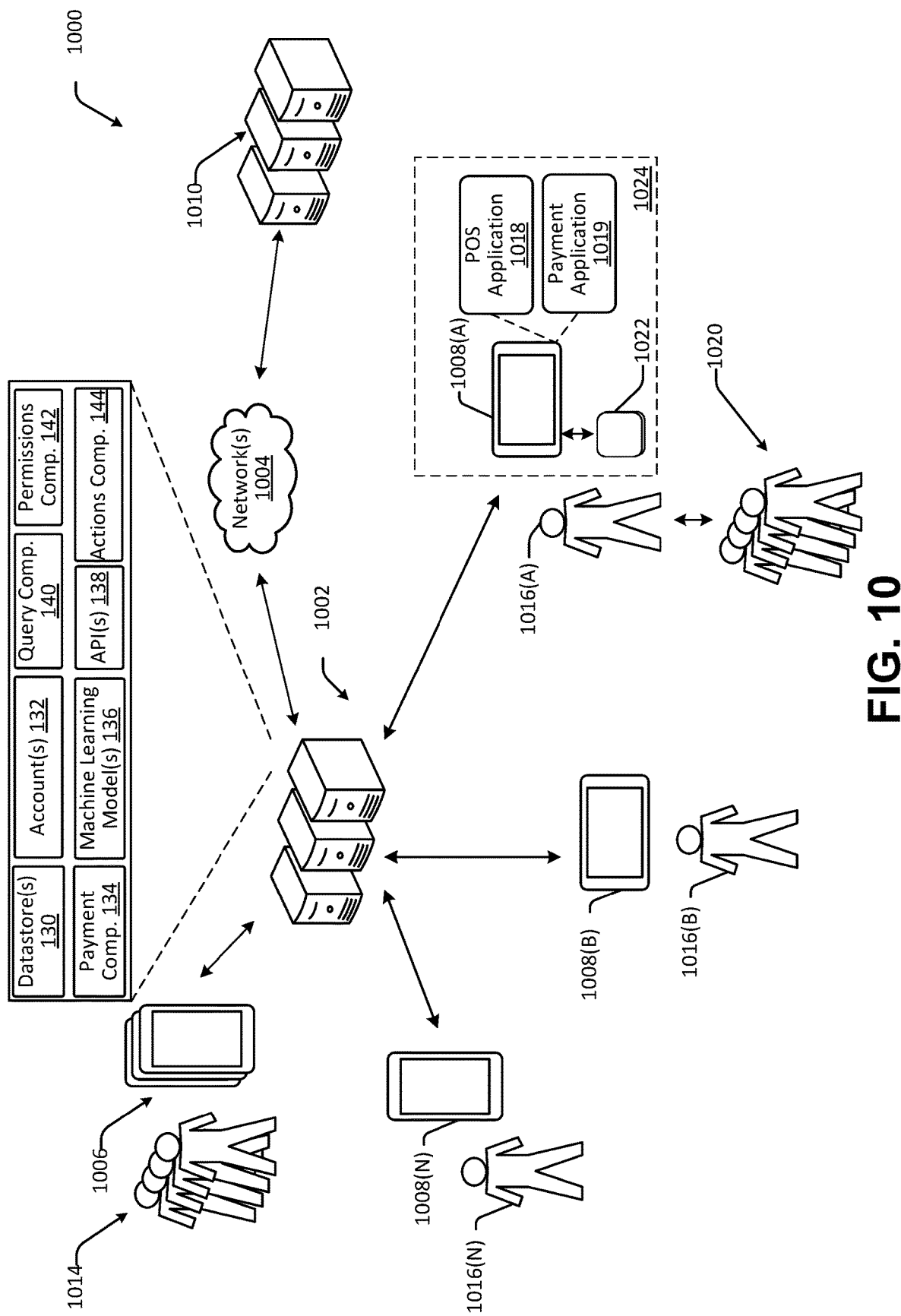
FIG. 10 is an example environment with user devices, merchant devices, a payment service, and/or other systems that may be involved in a transaction, such as by utilizing the payment application as configured herein, according to an embodiment described herein.

FIG. 10 is an example environment with user devices, merchant devices, a payment service, and/or other systems that may be involved in a transaction, such as by utilizing the payment application as configured herein, according to an embodiment described herein. The environment 1000 includes server(s) 1002 that can communicate over a network 1004 with user devices 1006 (which, in some examples can be merchant devices 1008 (individually, 1008(A)-1008(N))) and/or server(s) 1010 associated with third-party service provider(s). The server(s) 1002 can be associated with a service provider that can provide one or more services for the benefit of users 1014, as described below. Actions attributed to the service provider can be performed by the server(s) 1002.

In examples, the server(s) 1002 may be the same as or similar to the payment service 104 from FIG. 1, which may include the same or similar components as described with respect to the payment service 104 of FIG. 1, including the components of the CRM 128 as shown in FIG. 10. Further, the user devices 102 from FIG. 1 may have the same or similar components and perform the same or similar functionality as the user devices 1006 from FIG. 10.

The environment 1000 can include a plurality of user devices 1006, as described above. Each one of the plurality of user devices 1006 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1014. The users 1014 can be referred to as customers, buyers, merchants, sellers, borrowers, employees, employers, payors, payees, couriers and so on. The users 1014 can interact with the user devices 1006 via user interfaces presented via the user devices 1006. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1006 can have an instance or versioned instance of an application, which can be downloaded from an application store, for example, which can present the user interface(s) described herein. In at least one example, a user 1014 can interact with the user interface via touch input, spoken input, or any other type of input.

As described above, in at least one example, the users 1014 can include merchants 1016 (individually, 1016(A)-1016(N)). In an example, the merchants 1016 can operate respective merchant devices 1008, which can be user devices 1006 configured for use by merchants 1016. For the purpose of this discussion, a "merchant" can be any entity that offers items (e.g., goods or services) for purchase or other means of acquisition (e.g., rent, borrow, barter, etc.). The merchants 1016 can offer items for purchase or other means of acquisition via brick-and-mortar stores, mobile stores (e.g., pop-up shops, food trucks, etc.), online stores, combinations of the foregoing, and so forth. In some examples, at least some of the merchants 1016 can be associated with a same entity but can have different merchant locations and/or can have franchise/franchisee relationships. In additional or alternative examples, the merchants 1016 can be different merchants. That is, in at least one example, the merchant 1016(A) is a different merchant than the merchant 1016(B) and/or the merchant 1016(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 1008 can have an instance of a POS application 1018 stored thereon. The POS application 1018 can configure the merchant device 1008 as a POS terminal, which enables the merchant 1016(A) to interact with one or more customers 1020. As described above, the users 1014 can include customers, such as the customers 1020 shown as interacting with the merchant 1016(A). For the purpose of this discussion, a "customer" can be any entity that acquires items from merchants. While only two customers 1020 are illustrated in FIG. 10, any number of customers 1020 can interact with the merchants 1016. Further, while FIG. 10 illustrates the customers 1020 interacting with the merchant 1016(A), the customers 1020 can interact with any of the merchants 1016.

In at least one example, interactions between the customers 1020 and the merchants 1016 that involve the exchange of funds (from the customers 1020) for items (from the merchants 1016) can be referred to as "transactions." In at least one example, the POS application 1018 can determine transaction data associated with the POS transactions. Transaction data can include payment information, which can be obtained from a reader device 1022 associated with the merchant device 1008(A), user authentication data, purchase amount information, point-of-purchase information (e.g., item(s) purchased, date of purchase, time of purchase, etc.), etc. The POS application 1018 can send transaction data to the server(s) 1002 such that the server(s) 1002 can track transactions of the customers 1020, merchants 1016, and/or any of the users 1014 over time. Furthermore, the POS application 1018 can present a UI to enable the merchant 1016(A) to interact with the POS application 1018 and/or the service provider via the POS application 1018.

In at least one example, the merchant device 1008(A) can be a special-purpose computing device configured as a POS terminal (via the execution of the POS application 1018). In at least one example, the POS terminal may be connected to a reader device 1022, which is capable of accepting a variety of payment instruments, such as credit cards, debit cards, gift cards, short-range communication based payment instruments, and the like, as described below. In at least one example, the reader device 1022 can plug in to a port in the merchant device 1008(A), such as a microphone port, a headphone port, an audio-jack, a data port, or other suitable port. In additional or alternative examples, the reader device 1022 can be coupled to the merchant device 1008(A) via another wired or wireless connection, such as via a Bluetooth®, BLE, and so on. In some examples, the reader device 1022 can read information from alternative payment instruments including, but not limited to, wristbands and the like.

In some examples, the reader device 1022 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1022, and communicate with the server(s) 1002, which can provide, among other services, a payment processing service. The server(s) 1002 associated with the service provider can communicate with server(s) 1010, as described below. In this manner, the POS terminal and reader device 1022 may collectively process transaction(s) between the merchants 1016 and customers 1020. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1022 of the POS system 1024 are shown as separate devices, in additional or alternative examples, the POS terminal and the reader device 1022 can be part of a single device. In some examples, the reader device 1022 can have a display integrated therein for presenting information to the customers 1020. In additional or alternative examples, the POS terminal can have a display integrated therein for presenting information to the customers 1020. POS systems, such as the POS system 1024, may be mobile, such that POS terminals and reader devices may process transactions in disparate locations across the world. POS systems can be used for processing card-present transactions and card-not-present (CNP) transactions, as described below.

A card-present transaction is a transaction where both a customer 1020 and his or her payment instrument are physically present at the time of the transaction. Card-present transactions may be processed by swipes, dips, taps, or any other interaction between a physical payment instrument (e.g., a card), or otherwise present payment instrument, and a reader device 1022 whereby the reader device 1022 is able to obtain payment data from the payment instrument. A swipe is a card-present transaction where a customer 1020 slides a card, or other payment instrument, having a magnetic strip through a reader device 1022 that captures payment data contained in the magnetic strip. A dip is a card-present transaction where a customer 1020 inserts a payment instrument having an embedded microchip (i.e., chip) into a reader device 1022 first. The dipped payment instrument remains in the payment reader until the reader device 1022 prompts the customer 1020 to remove the card, or other payment instrument. While the payment instrument is in the reader device 1022, the microchip can create a one-time code which is sent from the POS system 1024 to the server(s) 1010 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 1020 may tap or hover his or her payment instrument (e.g., card, electronic device such as a smart phone running a payment application, etc.) over a reader device 1022 to complete a transaction via short-range communication (e.g., NFC, RFID, Bluetooth®, BLE, etc.). Short-range communication enables the payment instrument to exchange information with the reader device 1022. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 1024, the server(s) 1002, and/or the server(s) 1010 may exchange payment information and transaction data to determine whether transactions are authorized. For example, the POS system 1024 may provide encrypted payment data, user authentication data, purchase amount information, point-of-purchase information, etc. (collectively, transaction data) to server(s) 1002 over the network(s) 1004. The server(s) 1002 may send the transaction data to the server(s) 1010. As described above, in at least one example, the server(s) 1010 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 1010 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 1010 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 1010 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 1010 associated therewith), and a payment authorization message is communicated from the issuer to the POS device via a path opposite of that described above, or via an alternate path.

As described above, the server(s) 1010, which can be associated with payment service provider(s), may determine whether the transaction is authorized based on the transaction data, as well as information relating to parties to the transaction (e.g., the customer 1020 and/or the merchant 1016(A)). The server(s) 1010 may send an authorization notification over the network(s) 1004 to the server(s) 1002, which may send the authorization notification to the POS system 1024 over the network(s) 1004 to indicate whether the transaction is authorized. The server(s) 1002 may also transmit additional information such as transaction identifiers to the POS system 1024. In one example, the server(s) 1002 may include a merchant application and/or other functional components for communicating with the POS system 1024 and/or the server(s) 1010 to authorize or decline transactions.

Based on the authentication notification that is received by the POS system 1024 from server(s) 1002, the merchant 1016(A) may indicate to the customer 1020 whether the transaction has been approved. In some examples, approval may be indicated at the POS system 1024, for example, at a display of the POS system 1024. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 1014 can access all of the services of the service provider. In other examples, the users 1014 can have gradated access to the services, which can be based on risk tolerance, IDV outputs, subscriptions, and so on. In at least one example, access to such services can be availed to the merchants 1016 via the POS application 1018. In additional or alternative examples, each service can be associated with its own access point (e.g., application, web browser, etc.).

The service provider can offer payment processing services for processing payments on behalf of the merchants 1016, as described above. For example, the service provider can provision payment processing software, payment processing hardware and/or payment processing services to merchants 1016, as described above, to enable the merchants 1016 to receive payments from the customers 1020 when conducting POS transactions with the customers 1020. For instance, the service provider can enable the merchants 1016 to receive cash payments, payment card payments, and/or electronic payments from customers 1020 for POS transactions and the service provider can process transactions on behalf of the merchants 1016.

As the service provider processes transactions on behalf of the merchants 1016, the service provider can maintain accounts or balances for the merchants 1016 in one or more ledgers. For example, the service provider can analyze transaction data received for a transaction to determine an amount of funds owed to a merchant 1016(A) for the transaction. In at least one example, such an amount can be a total purchase price less fees charged by the service provider for providing the payment processing services. Based on determining the amount of funds owed to the merchant 1016(A), the service provider can deposit funds into an account of the merchant 1016(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 1016(A) to a bank account of the merchant 1016(A) that is held at a bank or other financial institution (e.g., associated with the server(s) 1010). Scheduled deposits can occur at a prearranged time after a POS transaction is funded, which can be a business day after the POS transaction occurred, or sooner or later. In some examples, the merchant 1016(A) can access funds prior to a scheduled deposit. For instance, the merchant 1016(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 1016(A) can have a payment instrument that is linked to the stored balance that enables the merchant to access the funds without first transferring the funds from the account managed by the service provider to the bank account of the merchant 1016(A).

In at least one example, the service provider may provide inventory management services. That is, the service provider may provide inventory tracking and reporting. Inventory management services may enable the merchant 1016(A) to access and manage a database storing data associated with a quantity of each item that the merchant 1016(A) has available (i.e., an inventory). Furthermore, in at least one example, the service provider can provide catalog management services to enable the merchant 1016(A) to maintain a catalog, which can be a database storing data associated with items that the merchant 1016(A) has available for acquisition (i.e., catalog management services). In at least one example, the catalog may include a plurality of data items and a data item of the plurality of data items may represent an item that the merchant 1016(A) has available for acquisition. The service provider can offer recommendations related to pricing of the items, placement of items on the catalog, and multi-party fulfilment of the inventory.

In at least one example, the service provider can provide business banking services, which allow the merchant 1016(A) to track deposits (from payment processing and/or other sources of funds) into an account of the merchant 1016(A), payroll payments from the account (e.g., payments to employees of the merchant 1016(A)), payments to other merchants (e.g., business-to-business) directly from the account or from a linked debit card, withdrawals made via scheduled deposit and/or instant deposit, etc. Furthermore, the business banking services can enable the merchant 1016(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1016 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1016. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider 1012 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 1014 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 1016. In at least one example, the service provider can recommend and/or generate content items to supplement omni-channel presences of the merchants 1016. That is, if a merchant of the merchants 1016 has a web page, the service provider—via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 1014 to set schedules for scheduling appointments and/or users 1014 to schedule appointments.

In some examples, the service provider can provide restaurant management services to enable users 1014 to make and/or manage reservations, to monitor front-of-house and/or back-of-house operations, and so on. In such examples, the merchant device(s) 1008 and/or server(s) 1002 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 1014 who can travel between locations to perform services for a requesting user 1014 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 1006.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 1014, voice inputs into a virtual assistant or the like, to determine intents of user(s) 1014. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 1014 may be new to the service provider such that the user 1014 that has not registered (e.g., subscribed to receive access to one or more services offered by the service provider) with the service provider. The service provider can offer onboarding services for registering a potential user 1014 with the service provider. In some examples, onboarding can involve presenting various questions, prompts, and the like to a potential user 1014 to obtain information that can be used to generate a profile for the potential user 1014. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 1014 providing all necessary information, the potential user 1014 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 1010). That is, the service provider can offer IDV services to verify the identity of users 1014 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 1014 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 1010 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 1002) and/or the server(s) 1010 via the network(s) 1004. In some examples, the merchant device(s) 1008 are not capable of connecting with the service provider (e.g., the server(s) 1002) and/or the server(s) 1010, due to a network connectivity issue, for example. In additional or alternative examples, the server(s) 1002 are not capable of communicating with the server(s) 1010 due to network connectivity issue, for example. In such examples, devices may operate in "offline" mode where at least some payment data is stored (e.g., on the merchant device(s) 1008) and/or the server(s) 1002 until connectivity is restored and the payment data can be transmitted to the server(s) 1002 and/or the server(s) 1010 for processing.

In at least one example, the service provider can be associated with a hub, such as an order hub, an inventory hub, a fulfillment hub and so on, which can enable integration with one or more additional service providers (e.g., associated with the additional server(s) 1010). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 1006 that are in communication with one or more server computing devices 1002 of the service provider. That is, techniques described herein are directed to a specific implementation—or, a practical application—of utilizing a distributed system of user devices 1006 that are in communication with one or more server computing devices 1002 of the service provider to perform a variety of services, as described above. The unconventional configuration of the distributed system described herein enables the server(s) 1002 that are remotely-located from end-users (e.g., users 1014) to intelligently offer services based on aggregated data associated with the end-users, such as the users 1014 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1014 and user devices 1006. Furthermore, such features are changed dynamically based on the profiles of the users involved interacting with the GUIs. As such, techniques described herein are directed to improvements to computing systems.

Figure 11:
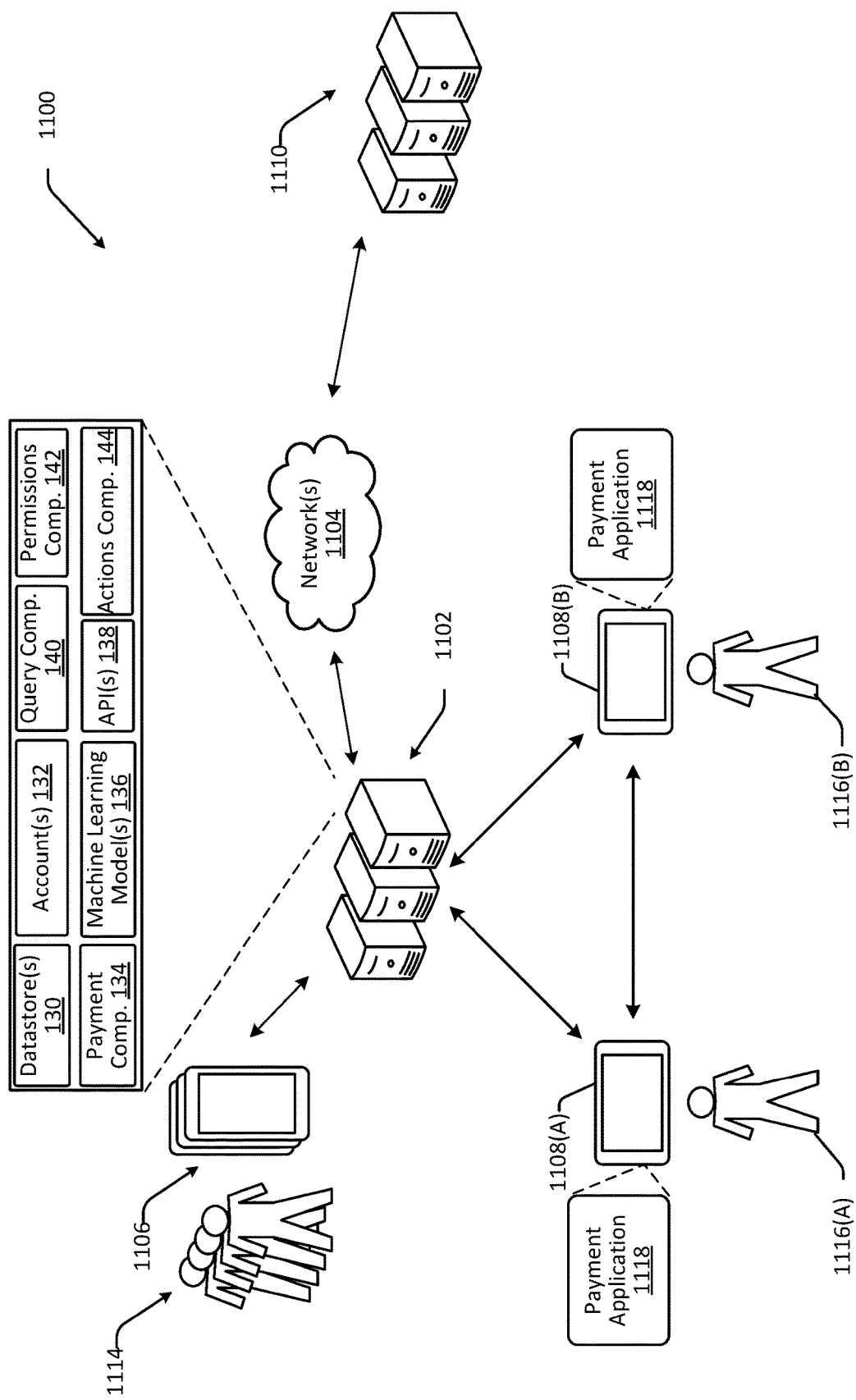
FIG. 11 is an example environment illustrating usage of the payment application, such as described herein, according to an embodiment described herein.

FIG. 11 is an example environment illustrating usage of the payment application, according to an embodiment described herein. The environment 1100 includes server(s) 1102 that can communicate over a network 1104 with user devices 1106 (which, in some examples can be user devices 1108 (individually, 1108(A), 1108(B)) and/or server(s) 1110 associated with third-party service provider(s). The server(s) 1102 can be associated with a service provider that can provide one or more services for the benefit of users 1114, as described below. Actions attributed to the service provider can be performed by the server(s) 1102. In some examples, the service provider referenced in FIG. 10 can be the same or different than the service provider referenced in FIG. 11.

As described herein, the server(s) 1102 may be the same or similar to the payment service 104 described with respect to FIG. 1, which may include the same or similar components as described with respect to the payment service 104 of FIG. 1, including the components of the CRM 128, as shown in FIG. 11. The user devices 1106, 1108 may be the same or similar to the user device 102 described with respect to FIG. 1. The server(s) 1110 associated with third-party service provider(s) may be the same as or similar to the systems associated with payment services or the like, as described herein.

The environment 1100 can include a plurality of user devices 1106, as described above. Each one of the plurality of user devices 1106 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1114. The users 1114 can be referred to as customers, buyers, merchants, sellers, borrowers, employees, employers, payors, payees, couriers and so on. The users 1114 can interact with the user devices 1106 via user interfaces presented via the user devices 1106. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1106 can have an instance or versioned instance of an application, which can be downloaded from an application store, for example, which can present the user interface(s) described herein. In at least one example, a user 1114 can interact with the user interface via touch input, spoken input, or any other type of input.

In at least one example, the service provider can provide a peer-to-peer payment service that enables peer-to-peer payments between two or more users 1114. Two users, user 1116(A) and user 1116(B) are illustrated in FIG. 11 as "peers" in a peer-to-peer payment. In at least one example, the service provider can communicate with instances of a payment application 1118 (or other access point) installed on devices configured for operation by users 1114. In an example, an instance of the payment application 1118 executing on a first device 1108(A) operated by a payor (e.g., user 1116(A)) can send a request to the service provider to transfer an asset (e.g., fiat currency, non-fiat currency, cryptocurrency, securities, gift cards, and/or related assets) from the payor to a payee (e.g., user 1116(B)) via a peer-to-peer payment. In some examples, assets associated with an account of the payor are transferred to an account of the payee. In some examples, assets can be held at least temporarily in an account of the service provider prior to transferring the assets to the account of the payee.

Figure 12:
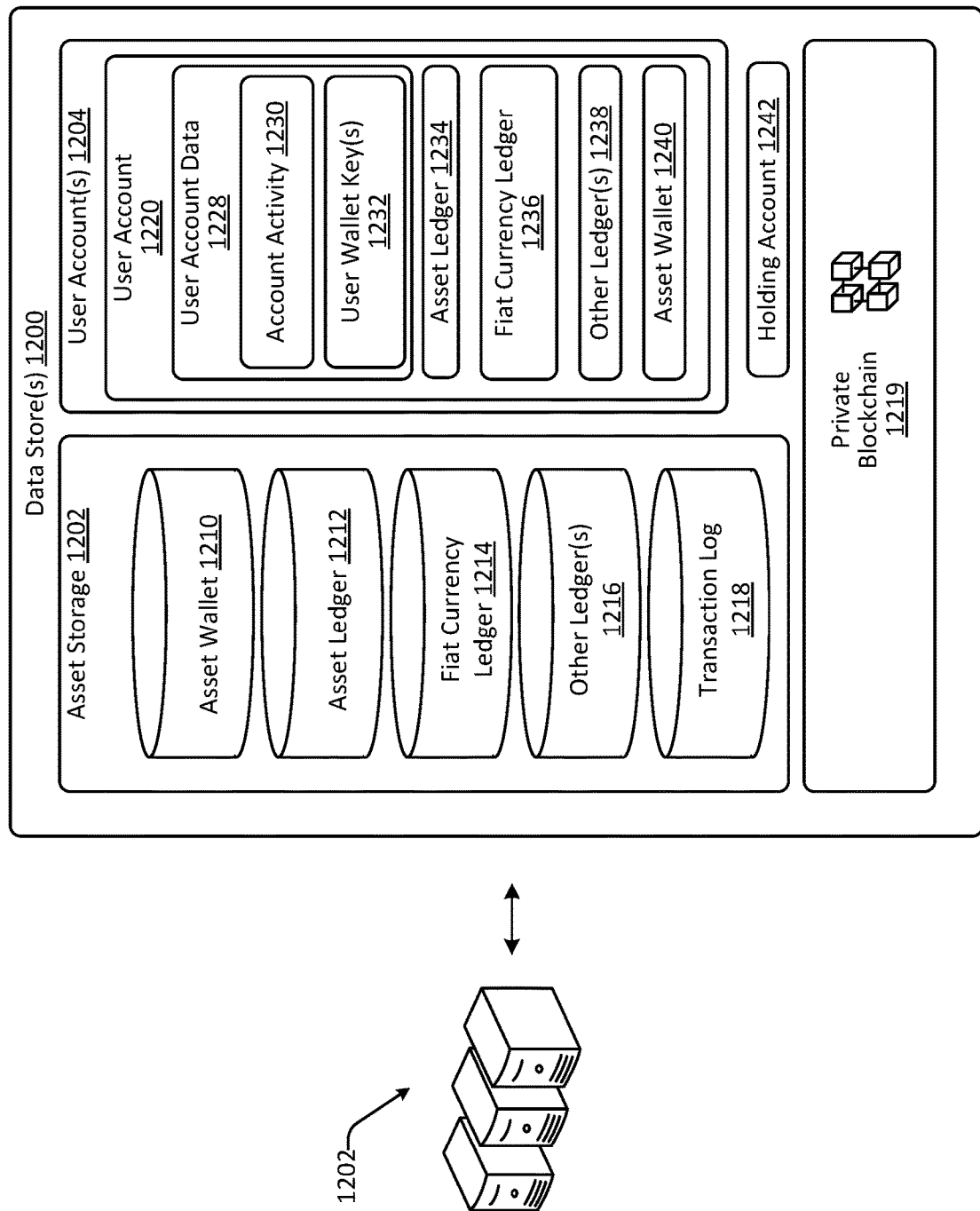
FIG. 12 is an example of datastore(s) that can be associated with servers of the payment service, according to an embodiment described herein.

In some examples, the service provider can utilize a ledger system to track transfers of assets between users 1106. FIG. 12, below, provides additional details associated with such a ledger system. The ledger system can enable users 1106 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 1118 executing on user device(s) of payee(s). As an example, the service provider can transfer assets from an account of user 1116(A) to an account of the user 1116(B) and can send a notification to the user device 1108(B) of the user 1116(B) for presentation via a user interface. The notification can indicate that a transfer is in process, a transfer is complete, or the like. In some examples, the service provider can send additional or alternative information to the instances of the payment application 1118 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 1102 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 1118 executing on the user devices 1106. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a given platform (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 11. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1106 (e.g., mobile device or conventional personal computer (PC)) based on instructions transmitted to and from the server(s) 1102 (which, in such an example can be called a "messaging server"). In some instances, the messaging application can include a payment application with messaging capability that enables users of the payment application to communicate with one another. In such instances, the payment application can be executed on a user device 1106 based on instructions transmitted to and from the server(s) 1102 (e.g., the payment service discussed in this description or another payment service that supports payment transactions). In some examples, the messaging application can be provided by a third-party service provider associated with the server(s) 1110. In examples where the messaging application is a third-party service provider, the server(s) 1110 can be accessible via one or more APIs or other integrations.

As described above, the service provider can facilitate peer-to-peer transactions, which can enable users 1114 to transfer fiat currency, non-fiat currency, cryptocurrency, securities, or other assets, or portions thereof, to other users 1114. In at least one example, individual users can be associated with user accounts. Additional details associated with user accounts and the transfer of assets between users 1114 are described below with reference to FIG. 12.

Furthermore, the service provider of FIG. 11 can enable users 1114 to perform banking transactions via instances of the payment application 1118. For example, users can configure direct deposits or other deposits for adding assets to their various ledgers/balances. Further, users 1114 can configure bill pay, recurring payments, and/or the like using assets associated with their accounts. In addition to sending and/or receiving assets via peer-to-peer transactions, users 1114 buy and/or sell assets via asset networks such as cryptocurrency networks, securities networks, and/or the like.

FIG. 12 is an example of data store(s) that can be associated with servers of the payment service, according to an embodiment described herein. In at least one example, the data store(s) 1200 can store assets in an asset storage 1202, as well as data in user account(s) 1204, merchant account(s) 1206, and/or customer account(s) 1208. In at least one example, the asset storage 1202 can be used to store assets managed by the service provider of FIG. 11. In at least one example, the asset storage 1202 can be used to record whether individual of the assets are registered to users. For example, the asset storage 1202 can include an asset wallet 1210 for storing records of assets owned by the service provider of FIG. 11, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 1110 can be associated therewith. In some examples, the asset wallet 1210 can communication with the asset network via one or more components associated with the server(s) 1102.

The asset wallet 1210 can be associated with one or more addresses and can vary addresses used to acquire assets (e.g., from the asset network(s)) so that its holdings are represented under a variety of addresses on the asset network. In examples where the service provider of FIG. 11 has its own holdings of cryptocurrency (e.g., in the asset wallet 1210), a user can acquire cryptocurrency directly from the service provider of FIG. 11. In some examples, the service provider of FIG. 11 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 1202 may contain ledgers that store records of assignments of assets to users 1106. Specifically, the asset storage 1202 may include asset ledger 1210, fiat currency ledger 1214, and other ledger(s) 1216, which can be used to record transfers of assets between users 1106 of the service provider and/or one or more third-parties (e.g., merchant network(s), payment card network(s), ACH network(s), equities network(s), the asset network, securities networks, etc.). In doing so, the asset storage 1202 can maintain a running balance of assets managed by the service provider of FIG. 11. The ledger(s) of the asset storage 1202 can further indicate some of the running balance for each of the ledger(s) stored in the asset storage 1202 is assigned or registered to one or more user account(s) 1204.

In at least one example, the asset storage 1202 can include transaction logs 1218, which can include records of past transactions involving the service provider of FIG. 11. In at least one example, transaction data, as described herein, can be stored in association with the transaction logs 1218.

In some examples, the data store(s) 1200 can store a private blockchain 1219. A private blockchain 1219 can function to record sender addresses, recipient addresses, public keys, values of cryptocurrency transferred, and/or can be used to verify ownership of cryptocurrency tokens to be transferred. In some examples, the service provider of FIG. 11 can record transactions taking place within the service provider of FIG. 11 involving cryptocurrency until the number of transactions has exceeded a determined limit (e.g., number of transactions, storage space allocation, etc.). Based at least in part on determining that the limit has been reached, the service provider of FIG. 11 can publish the transactions in the private blockchain 1219 to a public blockchain (e.g., associated with the asset network), where miners can verify the transactions and record the transactions to blocks on the public blockchain. In at least one example, the service provider of FIG. 11 can participate as miner(s) at least for its transactions to be posted to the public blockchain.

In at least one example, the data store(s) 1200 can store and/or manage accounts, such as user account(s) 1204, merchant account(s) 1206, and/or customer account(s) 1208. In at least one example, the user account(s) 1204 may store records of user accounts associated with the users 1106. In at least one example, the user account(s) 1204 can include a user account 1220, which can be associated with a user (of the users 1106). Other user accounts of the user account(s) 1204 can be similarly structured to the user account 1220, according to some examples. In other examples, other user accounts may include more or less data and/or account information than that provided by the user account 1220. In at least one example, the user account 1220 can include user account data 1228, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1228 can include account activity 1230 and user wallet key(s) 1232. The account activity 1230 may include a transaction log for recording transactions associated with the user account 1220. In some examples, the user wallet key(s) 1232 can include a public-private key-pair and a respective address associated with the asset network or other asset networks. In some examples, the user wallet key(s) 1232 may include one or more key pairs, which can be unique to the asset network or other asset networks.

In addition to the user account data 1228, the user account 1220 can include ledger(s) for account(s) managed by the service provider of FIG. 11, for the user. For example, the user account 1220 may include an asset ledger 1234, a fiat currency ledger 1236, and/or one or more other ledgers 1238. The ledger(s) can indicate that a corresponding user utilizes the service provider of FIG. 11 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 11.

In some examples, the asset ledger 1234 can store a balance for each of one or more cryptocurrencies (e.g., Bitcoin, Ethereum, Litecoin, etc.) registered to the user account 1220. In at least one example, the asset ledger 1234 can further record transactions of cryptocurrency assets associated with the user account 1220. For example, the user account 1220 can receive cryptocurrency from the asset network using the user wallet key(s) 1232. In some examples, the user wallet key(s) 1232 may be generated for the user upon request. User wallet key(s) 1232 can be requested by the user in order to send, exchange, or otherwise control the balance of cryptocurrency held by the service provider of FIG. 11 (e.g., in the asset wallet 1210) and registered to the user. In some examples, the user wallet key(s) 1232 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 11 and the value is credited as a balance in asset ledger 1234), by purchasing currency in the form associated with the account using currency in a different form (e.g., buying a value of cryptocurrency from the service provider of FIG. 11 using a value of fiat currency reflected in fiat currency ledger 1214, and crediting the value of cryptocurrency in asset ledger 1234), or by conducting a transaction with another user (customer or merchant) of the service provider of FIG. 11 wherein the account receives incoming currency (which can be in the form associated with the account or a different form, in which the incoming currency may be converted to the form associated with the account). In some examples, the user account data 1228 can include preferences for maintaining balances of individual of the ledgers. For example, the service provider of FIG. 11 can automatically debit the fiat currency ledger 1236 to increase the asset ledger 1234, or another account associated with the user whenever the cryptocurrency balance (e.g., of the asset ledger 1234) falls below a stated level (e.g., a threshold). Conversely, in some embodiments, the service provider of FIG. 11 can automatically credit the fiat currency ledger 1236 to decrease the asset ledger 1234 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party (e.g., associated with the third-party server(s)) unrelated to the service provider of FIG. 11 (i.e., an external account). In at least one example, the user can transfer all or a portion of a balance of the cryptocurrency stored in the third-party cryptocurrency wallet to the service provider of FIG. 11. Such a transaction can require the user to transfer an amount of the cryptocurrency in a message signed by user's private key to an address provided by the service provider of FIG. 11. In at least one example, the transaction can be sent to miners to bundle the transaction into a block of transactions and to verify the authenticity of the transactions in the block. Once a miner has verified the block, the block is written to a public, distributed blockchain where the service provider of FIG. 11 can then verify that the transaction has been confirmed and can credit the user's asset ledger 1234 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 11. As described above, in some examples, the service provider of FIG. 11 can acquire cryptocurrency from a third-party source (e.g., associated with the third-party server(s)). In such examples, the asset wallet 1210 can be associated with different addresses and can vary addresses used to acquire cryptocurrency so that its holdings are represented under a variety of addresses on a blockchain. When the service provider of FIG. 11 has their own holdings of cryptocurrency, users can acquire cryptocurrency directly from the service provider of FIG. 11. In some examples, the service provider of FIG. 11 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 11 has its own cryptocurrency assets, cryptocurrency transferred in a transaction (e.g., data with address provided for receipt of transaction and a balance of cryptocurrency transferred in the transaction) can be stored in the asset wallet 1210. In at least one example, the service provider of FIG. 11 can credit the asset ledger 1234 of the user. Additionally, while the service provider of FIG. 11 recognizes that the user retains the value of the transferred cryptocurrency through crediting the asset ledger 1234, any person that inspects the blockchain will see the cryptocurrency as having been transferred to the service provider of FIG. 11. In some examples, the asset wallet 1210 can be associated with many different addresses. In such examples, any person that inspects the blockchain may not easily associate all cryptocurrency stored in asset wallet 1210 as belonging to the same entity. It is this presence of a private ledger that is used for real-time transactions and maintained by the service provider of FIG. 11, combined with updates to the public ledger at other times, that allows for extremely fast transactions using cryptocurrency to be achieved. In some examples, the "private ledger" can refer to the asset ledger 1210, which in some examples, can utilize the private blockchain 1219, as described herein. The "public ledger" can correspond to a public blockchain associated with the asset network.

In at least one example, a user's asset ledger 1234, fiat currency ledger 1236, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1234. In some examples, a user can receive fiat currency or another currency in the form of payment for a transaction with another user. In at least one example, at least a portion of such funds can be converted into cryptocurrency by the service provider of FIG. 11 and used to fund the asset ledger 1234 of the user.

As addressed above, in some examples, users can also have other accounts maintained by the service provider of FIG. 11. For example, a user can also have an account in U.S. dollars, which can be tracked, for example, via the fiat currency ledger 1236. Such an account can be funded by transferring money from a bank account at a third-party bank to an account maintained by the service provider of FIG. 11 as is conventionally known. In some examples, a user can receive fiat currency in the form of payment for a transaction with another user. In such examples, at least a portion of such funds can be used to fund the fiat currency ledger 1236.

In some examples, a user can have one or more internal payment cards registered with the service provider of FIG. 11. Internal payment cards can be linked to one or more of the accounts associated with the user account 1220. In some embodiments, options with respect to internal payment cards can be adjusted and managed using an application (e.g., the payment application 1118).

In at least one example, as described above, each ledger can correspond to an account of the user that is managed by the service provider of FIG. 11. In at least one example, individual of the accounts can be associated with a wallet or a stored balance for use in payment transactions, peer-to-peer transactions, payroll payments, etc.

In at least one example, the user account 1220 can be associated with an asset wallet 1240. The asset wallet 1240 of the user can be associated with account information that can be stored in the user account data 1228 and, in some examples, can be associated with the user wallet key(s) 1232. In at least one example, the asset wallet 1240 can store data indicating an address provided for receipt of a cryptocurrency transaction. In at least one example, the balance of the asset wallet 1240 can be based at least in part on a balance of the asset ledger 1234. In at least one example, funds availed via the asset wallet 1240 can be stored in the asset wallet 1240 or the asset wallet 1210. Funds availed via the asset wallet 1210 can be tracked via the asset ledger 1234. The asset wallet 1240, however, can be associated with additional cryptocurrency funds.

In at least one example, when the service provider of FIG. 11 includes a private blockchain 1219 for recording and validating cryptocurrency transactions, the asset wallet 1240 can be used instead of, or in addition to, the asset ledger 1234. For example, at least one example, a merchant can provide the address of the asset wallet 1240 for receiving payments. In an example where a customer is paying in cryptocurrency and the customer has their own cryptocurrency wallet account associated with the service provider of FIG. 11, the customer can send a message signed by its private key including its wallet address (i.e., of the customer) and identifying the cryptocurrency and value to be transferred to the merchant's asset wallet 1240. The service provider of FIG. 11 can complete the transaction by reducing the cryptocurrency balance in the customer's cryptocurrency wallet and increasing the cryptocurrency balance in the merchant's asset wallet 1240. In addition to recording the transaction in the respective cryptocurrency wallets, the transaction can be recorded in the private blockchain 1219 and the transaction can be confirmed. A user can perform a similar transaction with cryptocurrency in a peer-to-peer transaction as described above. In at least one example, the cryptocurrency wallet account 1230 can be funded by a balance transfer from a third-party cryptocurrency wallet, as described above. Such a transaction can require a user to transfer an amount of cryptocurrency in a message signed by the user's private key to an address of the cryptocurrency wallet account 1230. The transferred amount of cryptocurrency can then be within the cryptocurrency wallet account 1230 for use in later transactions.

While the asset ledger 1234 and/or asset wallet 1240 are each described above with reference to cryptocurrency, the asset ledger 1234 and/or asset wallet 1240 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider of FIG. 11 is an aspect of the technology disclosed that enables technical advantages of increased processing speed and improved security.

Figure 13:
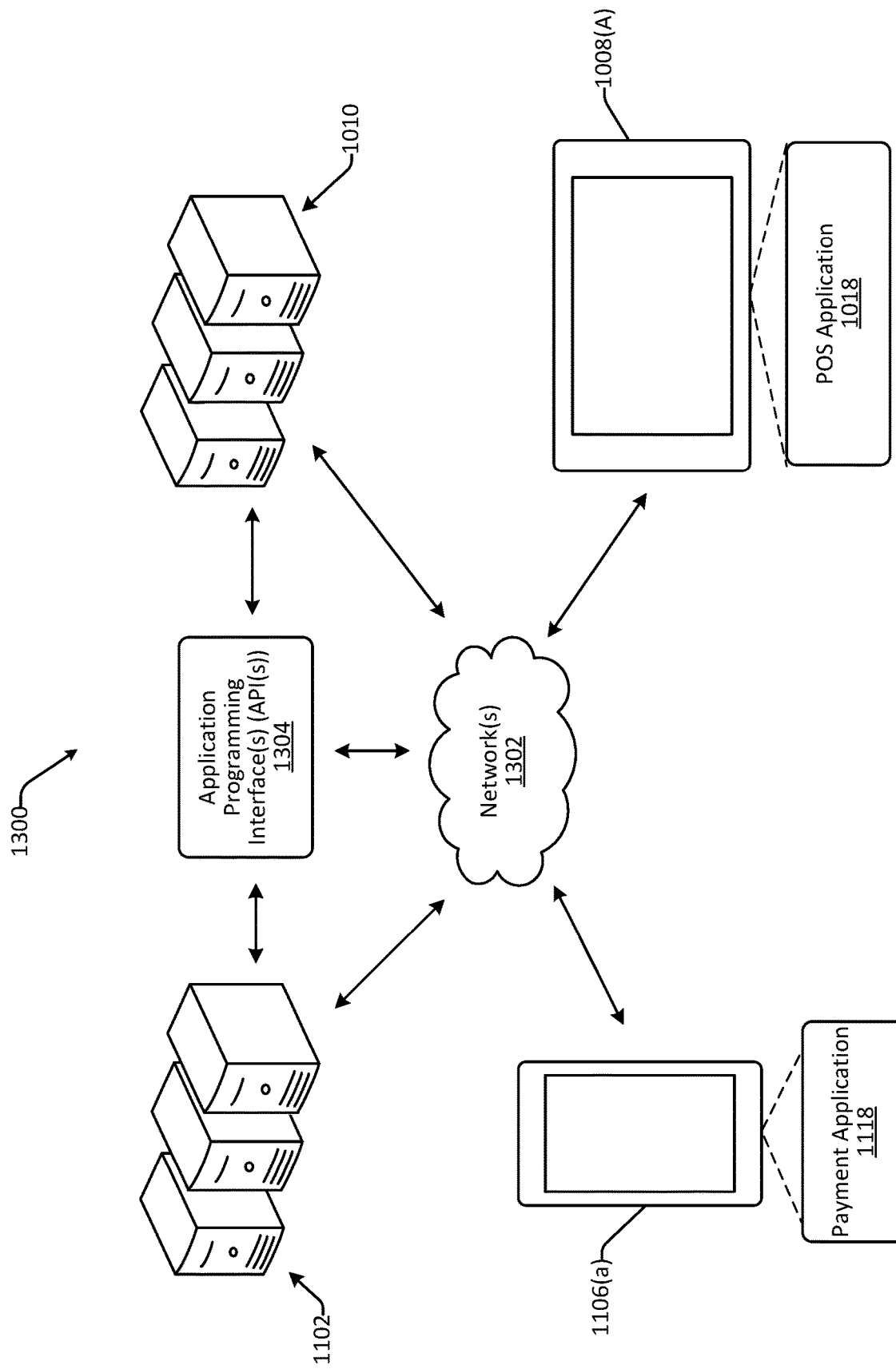
FIG. 13 is an example environment wherein the payment service environment of FIG. 10 and the environment from FIG. 11 can be integrated to enable payments at the point-of-sale using assets associated with user accounts in the peer-to-peer environment of FIG. 11, according to an embodiment described herein.

FIG. 13 is an example environment 1300 wherein the environment 1000 and the environment 1100 can be integrated to enable payments at the point-of-sale using assets associated with user accounts in the peer-to-peer environment of FIG. 11, according to an embodiment described herein. As illustrated, each of the components can communicate with one another via one or more networks 1302. In some examples, one or more APIs 1304 or other functional components can be used to facilitate such communication. For example, the APIs 1304 can be used to facilitate communication with payment service server(s) 1102 and server(s) 1110 associated with third-party service provider (s).

In at least one example, the example environment 1300 can enable contactless payments, via integration of peer-to-peer payment, or other payment making, platform(s) and payment processing platform(s), are described herein. For the purpose of FIG. 13, the environment 1000 can refer to a payment processing platform and the environment 1100 can refer to a peer-to-peer payment, or payment making, platform. In an example, such an integration can enable a customer to participate in a transaction via their own computing device instead of interacting with a merchant device of a merchant, such as the merchant device 1008(A). In such an example, the POS application 1018, associated with a payment processing platform and executable by the merchant device 1008(A) of the merchant, can present a Quick Response (QR) code, or other code that can be used to identify a transaction (e.g., a transaction code), in association with a transaction between the customer and the merchant. The QR code, or other transaction code, can be provided to the POS application 1018 via an API associated with the peer-to-peer payment platform. In an example, the customer can utilize their own computing device, such as the user device 1108(A), to capture the QR code, or the other transaction code, and to provide an indication of the captured QR code, or other transaction code, to server(s) 1002 and/or server(s) 1102.

Based at least in part on the integration of the peer-to-peer payment platform and the payment processing platform (e.g., via the API), the server(s) 1002 and/or 1102 associated with each can exchange communications with each other— and with a payment application 1118 associated with the peer-to-peer payment platform and/or the POS application 1018—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 1108(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1108(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1018 and the payment application 1118, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 1108(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 1018, associated with a payment processing platform, on the merchant device 1008(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 1008(A) can present a QR code, or other transaction code, that can be associated with a peer-to-peer payment platform. The customer can use a camera associated with the user device 1108(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 1018, associated with a payment processing platform, on the merchant device 1008(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 1018 can cause a text message with a resource locator (e.g., uniform resource locator (URL)) that can be associated with a peer-to-peer payment platform to be sent to the user device 1108(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction—between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 1108(A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 1018 of a merchant device 1008(A) at a brick-and-mortar store of a merchant to a payment application 1118 of a user device 1108(A) of a customer to enable the customer to participate in a transaction via their own computing device. For instance, in a "scan to pay" example as described above, based at least in part on capturing the QR code, or other transaction code, via the user device 1108(A), the payment processing platform can provide transaction data to the peer-to-peer payment platform for presentation via the payment application 1118 on the user device 1108(A). In some examples, the customer can watch items being added to their cart (e.g., via a user interface presented via the payment application). As an item is added to a virtual cart by the merchant—via the POS application 1018 on the merchant device 1008(A) of the merchant—the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 1118 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 1108(A) during or after payment of the transaction.

In some examples, based at least in part on capturing the QR code, or other transaction code, the payment processing platform can provide transaction data to the peer-to-peer payment platform for presentation via the payment application 1118 on the computing device of the customer, such as the user device 1108(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g. implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 1118 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above—and also below—techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 1018, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1118 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

Figure 14:
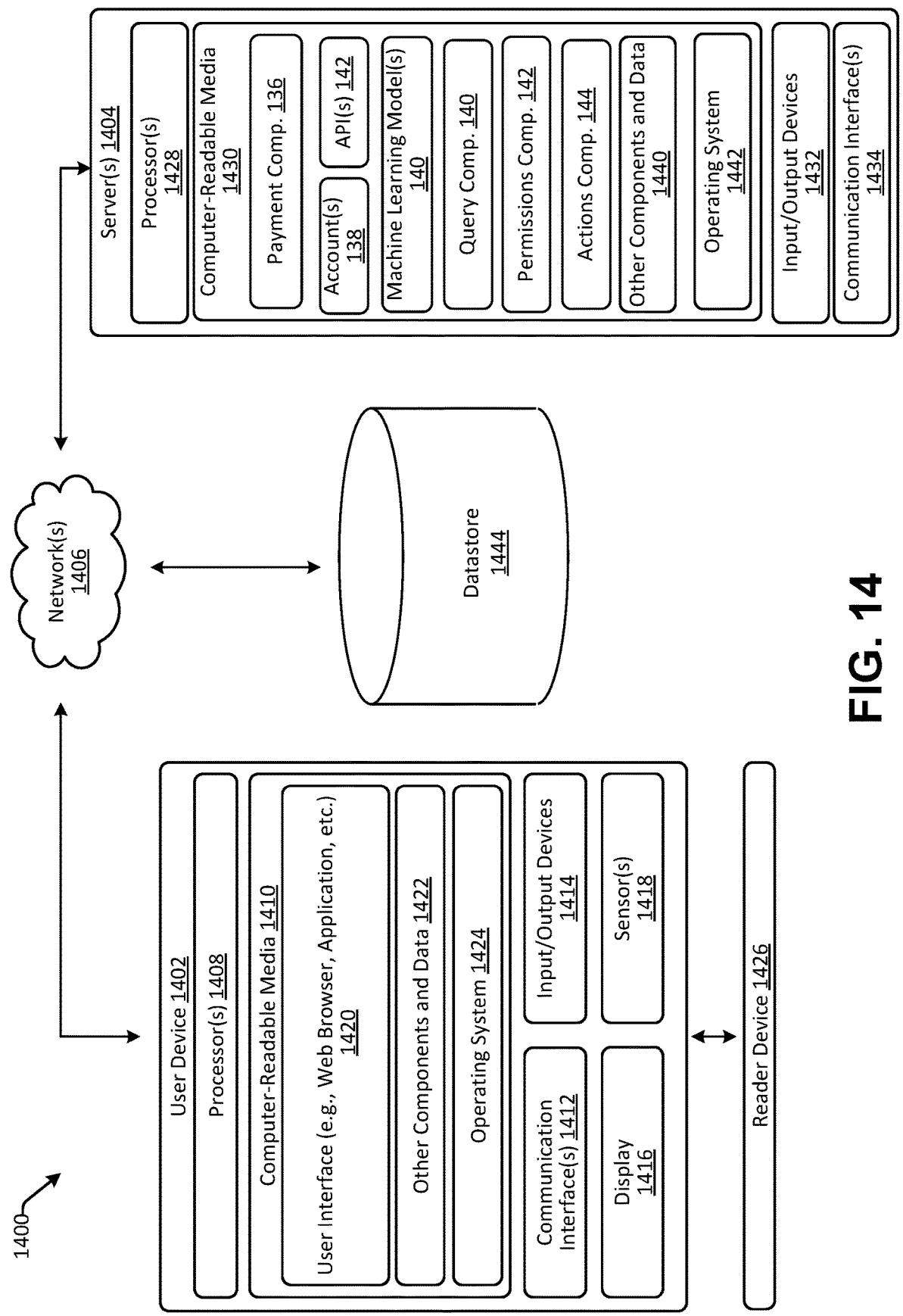
FIG. 14 is an illustrative block diagram illustrating a system for performing techniques described herein, according to an embodiment described herein.

FIG. 14 is an illustrative block diagram illustrating a system for performing techniques described herein, according to an embodiment described herein. The system 1400 includes a user device 1402, that communicates with server computing device(s) (e.g., server(s) 1404) via network(s) 1406 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1402 is illustrated, in additional or alternate examples, the system 1400 can have multiple user devices, as described above with reference to FIG. 14.

The user device 1402 may be the same or similar to the user device 102 as described with respect to FIG. 1. Additionally, the server(s) 1404 may be the same or similar to the payment service 104 described with respect to FIG. 1.

In at least one example, the user device 1402 can be any suitable type of computing device, e.g., portable, semi-portable, semi-stationary, or stationary. Some examples of the user device 1402 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1402 can be any computing device capable of sending communications and performing the functions according to the techniques described herein. The user device 1402 can include devices, e.g., payment card readers, or components capable of accepting payments, as described below.

In the illustrated example, the user device 1402 includes one or more processors 1408, one or more computer-readable media 1410, one or more communication interface(s) 1412, one or more input/output (I/O) devices, a display 1416, and sensor(s) 1418.

In at least one example, each processor 1408 can itself comprise one or more processors or processing cores. For example, the processor(s) 1408 can be implemented as one or more microprocessors, microcomputers, microcontrollers, digital signal processors, central processing units, state machines, logic circuitries, and/or any devices that manipulate signals based on operational instructions. In some examples, the processor(s) 1408 can be one or more hardware processors and/or logic circuits of any suitable type specifically programmed or configured to execute the algorithms and processes described herein. The processor(s) 1408 can be configured to fetch and execute computer-readable processor-executable instructions stored in the computer-readable media 1410.

Depending on the configuration of the user device 1402, the computer-readable media 1410 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1410 can include, but is not limited to, RAM, ROM, EEPROM, flash memory, solid-state storage, magnetic disk storage, optical storage, and/or other computer-readable media technology. Further, in some examples, the user device 1402 can access external storage, such as RAID storage systems, storage arrays, network attached storage, storage area networks, cloud storage, or any other medium that can be used to store information and that can be accessed by the processor(s) 1408 directly or through another computing device or network. Accordingly, the computer-readable media 1410 can be computer storage media able to store instructions, components or components that can be executed by the processor(s) 1408. Further, when mentioned, non-transitory computer-readable media exclude media such as energy, carrier signals, electromagnetic waves, and signals per se.

The computer-readable media 1410 can be used to store and maintain any number of functional components that are executable by the processor(s) 1408. In some implementations, these functional components comprise instructions or programs that are executable by the processor(s) 1408 and that, when executed, implement operational logic for performing the actions and services attributed above to the user device 1402. Functional components stored in the computer-readable media 1410 can include a user interface 1420 to enable users to interact with the user device 1402, and thus the server(s) 1404 and/or other networked devices. In at least one example, the user interface 1420 can be presented via a web browser, or the like. In other examples, the user interface 1420 can be presented via an application, such as a mobile application or desktop application, which can be provided by a service provider associated with the server(s) 1404, or which can be an otherwise dedicated application. In some examples, the user interface 1420 can be configured to display options for withdrawing funds to make donations. The user interface 1420 may also be configured to surface information about donations. It should be understood that the user interface 1420 can be configured to display, facilitate, or otherwise perform any of the interactions described herein with respect to transactions or other operations as described herein. In at least one example, a user can interact with the user interface via touch input, spoken input, gesture, or any other type of input. The word "input" is also used to describe "contextual" input that may not be directly provided by the user via the user interface 1420. For example, user's interactions with the user interface 1420 are analyzed using, e.g., natural language processing techniques, to determine context or intent of the user, which may be treated in a manner similar to "direct" user input.

Depending on the type of the user device 1402, the computer-readable media 1410 can also optionally include other functional components and data, such as other components and data 1422, which can include programs, drivers, etc., and the data used or generated by the functional components. In addition, the computer-readable media 1410 can also store data, data structures and the like, that are used by the functional components. Further, the user device 1402 can include many other logical, programmatic and physical components, of which those described are merely examples that are related to the discussion herein.

In at least one example, the computer-readable media 1410 can include additional functional components, such as an operating system for controlling and managing various functions of the user device 1402 and for enabling basic user interactions.

The communication interface(s) 1412 can include one or more interfaces and hardware components for enabling communication with various other devices, such as over the network(s) 1406 or directly. For example, communication interface(s) 1412 can enable communication through one or more network(s) 1406, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1406 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1402 can further include one or more input/output (I/O) devices. The I/O devices can include speakers, a microphone, a camera, and various user controls (e.g., buttons, a joystick, a keyboard, a keypad, etc.), a haptic output device, and so forth. The I/O devices can also include attachments that leverage the accessories (audio-jack, USB-C, Bluetooth, etc.) to connect with the user device 1402.

In at least one example, user device 1402 can include a display 1416. Depending on the type of computing device(s) used as the user device 1402, the display 1416 can employ any suitable display technology. For example, the display 1416 can be a liquid crystal display, a plasma display, a light emitting diode display, an OLED (organic light-emitting diode) display, an electronic paper display, or any other suitable type of display able to present digital content thereon. In at least one example, the display 1416 can be an augmented reality display, a virtually reality display, or any other display able to present and/or project digital content. In some examples, the display 1416 can have a touch sensor associated with the display 1416 to provide a touchscreen display configured to receive touch inputs for enabling interaction with a graphic interface presented on the display 1416. Accordingly, implementations herein are not limited to any particular display technology. Alternatively, in some examples, the user device 1402 may not include the display 1416, and information can be presented by other means, such as aurally, haptically, etc.

In addition, the user device 1402 can include sensor(s) 1418. The sensor(s) 1418 can include a GPS device able to indicate location information. Further, the sensor(s) 1418 can include, but are not limited to, an accelerometer, gyroscope, compass, proximity sensor, camera, microphone, and/or a switch.

In some example, the GPS device can be used to identify a location of a user. In at least one example, the location of the user can be used by the service provider 1424, described above, to provide one or more services. That is, in some examples, the service provider 1424 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 1414 and/or for sending users 1414 notifications regarding available appointments with merchant(s) located proximate to the users 1414. In at least one example, location can be used for taking payments from nearby customers when they leave a geofence, or location can be used to initiate an action responsive to users 1414 enter a brick-and-mortar store of a merchant. Location can be used in additional or alternative ways as well.

Additionally, the user device 1402 can include various other components that are not shown, examples of which include removable storage, a power source, such as a battery and power control unit, a barcode scanner, a printer, a cash drawer, and so forth.

In addition, in some examples, the user device 1402 can include, be connectable to, or otherwise be coupled to a reader device 1426, for reading payment instruments and/or identifiers associated with payment objects. In some examples, as described above, the reader device 1426 can plug in to a port in the user device 1402, such as a microphone port, a headphone port, an audio-jack, a data port, or other suitable port. In additional or alternative examples, the reader device 1426 can be coupled to the user device 1402 via another wired or wireless connection, such as via a Bluetooth®, BLE, and so on. The reader device 1426 can include a read head for reading a magnetic strip of a payment card, and further can include encryption technology for encrypting the information read from the magnetic strip. Additionally or alternatively, the reader device 1426 can be an EMV payment reader, which in some examples, can be embedded in the user device 1402. Moreover, numerous other types of readers can be employed with the user device 1402 herein, depending on the type and configuration of the user device 1402.

The reader device 1426 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1426 may include hardware implementation, such as slots, magnetic tracks, and rails with one or more sensors or electrical contacts to facilitate detection and acceptance of a payment instrument. That is, the reader device 1426 may include hardware implementations to enable the reader device 1426 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1426 may also include a biometric sensor to receive and process biometric characteristics and process them as payment instruments, given that such biometric characteristics are registered with the payment service 104 and connected to a financial account with a bank server.

The reader device 1426 may include processing unit(s), computer-readable media, a reader chip, a transaction chip, a timer, a clock, a network interface, a power supply, and so on. The processing unit(s) of the reader device 1426 may execute one or more components and/or processes to cause the reader device 1426 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1426, the computer-readable media may include volatile memory (such as RAM), non-volatile memory (such as ROM, flash memory, miniature hard drive, memory card, or the like), or some combination thereof. In at least one example, the computer-readable media of the reader device 1426 may include at least one component for performing various functions as described herein.

The reader chip may perform functionalities to control the operations and processing of the reader device 1426. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock, which may provide a clock signal indicating a time. Furthermore, the reader chip may perform functionality to control the network interface, which may interface with the network(s) 1406, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1426. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1402, which can be a POS terminal, and the reader device 1426 are shown as separate devices, in additional or alternative examples, the user device 1402 and the reader device 1426 can be part of a single device, which may be a battery-operated device. In such an example, components of both the user device 1402 and the reader device 1426 may be associated with the single device. In some examples, the reader device 1426 can have a display integrated therewith, which can be in addition to (or as an alternative of) the display 1416 associated with the user device 1402.

The server(s) 1404 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1404 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1404 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1404 can include one or more processors 1428, one or more computer-readable media 1430, one or more I/O devices 1432, and one or more communication interfaces 1434. Each processor 1428 can be a single processing unit or a number of processing units, and can include single or multiple computing units or multiple processing cores. The processor(s) 1428 can be implemented as one or more microprocessors, microcomputers, microcontrollers, digital signal processors, central processing units, state machines, logic circuitries, and/or any devices that manipulate signals based on operational instructions. For example, the processor(s) 1428 can be one or more hardware processors and/or logic circuits of any suitable type specifically programmed or configured to execute the algorithms and processes described herein. The processor(s) 1428 can be configured to fetch and execute computer-readable instructions stored in the computer-readable media 1430, which can program the processor(s) 1428 to perform the functions described herein.

The computer-readable media 1430 can include volatile and nonvolatile memory and/or removable and non-removable media implemented in any type of technology for storage of information, such as computer-readable instructions, data structures, program components, or other data. Such computer-readable media 1430 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1404, the computer-readable media 1430 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1430 can be used to store any number of functional components that are executable by the processor(s) 1428. In many implementations, these functional components comprise instructions or programs that are executable by the processors 1428 and that, when executed, specifically configure the one or more processors 1428 to perform the actions attributed above to the service provider and/or payment processing service. Functional components stored in the computer-readable media 1430 can optionally include the components described with respect to the CRM 128 from FIG. 1, as shown in FIG. 14.

The other components may include a training component that can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1402 and/or the server(s) 1404 for use at a time after the data models have been trained (e.g., at runtime).

The one or more other components and data 1440 can include programs, drivers, etc., and the data used or generated by the functional components. Further, the server(s) 1404 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1430 can additionally include an operating system 1442 for controlling and managing various functions of the server(s) 1404.

The communication interface(s) 1434 can include one or more interfaces and hardware components for enabling communication with various other devices, such as over the network(s) 1406 or directly. For example, communication interface(s) 1434 can enable communication through one or more network(s) 1406, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1404 can further be equipped with various I/O devices 1432. Such I/O devices 1432 can include a display, various user interface controls (e.g., buttons, joystick, keyboard, mouse, touch screen, biometric or sensory input devices, etc.), audio speakers, connection ports and so forth.

In at least one example, the system 1400 can include a datastore 1444 that can be configured to store data that is accessible, manageable, and updatable. In some examples, the datastore 1444 can be integrated with the user device 1402 and/or the server(s) 1404. In other examples, as shown in FIG. 14, the datastore 1444 can be located remotely from the server(s) 1404 and can be accessible to the server(s) 1404. The datastore 1444 can comprise multiple databases and/or servers connected locally and/or remotely via the network(s) 1406.

In at least one example, the datastore 1444 can store user profiles, which can include merchant profiles, customer profiles, and so on. In some examples, the datastore(s) 1444 can store user profiles of customers, merchants, the payment service, etc., as described herein. In some examples, such user profiles can be associated with one or more user accounts.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Furthermore, in at least one example, the datastore 1444 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1444 can store additional or alternative types of data as described herein.

Example Clauses

1. A method implemented at least in part by a computing device of a payment service, comprising: providing, conditional on users of the payment service granting sharing permissions, personal data associated with the users of the payment service to a data service managed by a third party, wherein: the personal data associated with the users of the payment service comprises a first portion of data stored by the data service with which the payment service has exclusive reading and control privileges; the data service is configured to store a second portion of data with which a service provider, different than the payment service, has exclusive reading and control privileges; and the second portion of data comprises personal data associated with users of the service provider; configuring a query associated with one or more attributes of data stored by the data service; receiving, from the data service and based at least in part on the service provider provisioning a temporary viewing permission to the payment service, a query result associated with the first portion of data and the second portion of data; and utilizing the query result to perform actions between the payment service and the service provider.

2. The method of clause 1, wherein the temporary viewing permission is terminated based at least in part on the payment service receiving the query result.

3. The method of clauses 1 and/or 2, further comprising provisioning another temporary viewing permission to the service provider for the service provider to view an abstracted version of the personal data.

4. The method of any of clauses 1, 2, and/or 3, wherein the query result represents an abstraction of the first portion of data and the second portion of data, based at least in part on the one or more attributes of the query, and excludes data indicated as personal data associated with the first portion of data and the second portion of data.

5. The method of any of clauses 1, 2, 3, and/or 4, further comprising: identifying a portion of the users that are associated with the payment service and the service provider from the query results; and wherein the query results are associated with the portion of the users.

6. The method of any of clauses 1, 2, 3, 4, and/or 5, further comprising sending, to the data service, data indicating a targeted portion of the users associated with the service provider, wherein a version of the data is made available to the service provider from the data service.

7. A method implemented at least in part by a computing device of a payment service, comprising: providing, conditional on users of the payment service granting sharing permissions, personal data associated with the users of the payment service to a data service, wherein the personal data associated with the users of the payment service comprises at least one of personal user identifiers of the users of the payment service and anonymous user identifiers provided for the users of the payment service by the payment service; configuring a query to determine which of the users of the payment service are eligible for a promotion from a third party service, wherein personal data associated with users of the third party service is also stored by the data service, and wherein personal data associated with the users of the third party service comprises at least one of personal user identifiers of the users of the third party service and indications of eligible promotions for the users of the third party service; sending the query to the data service; receiving, from the data service and based at least in part on the third party service provisioning a temporary viewing permission to the payment service, a query result indicating (i) overlapping users between the payment service and the third party service and (ii) the eligible promotions for individual of overlapping users, wherein the query result excludes personal identifiers stored by the data service; and causing the eligible promotions to be presented to individual of the overlapping users via respective instances of a payment application, associated with the payment service, that is executing on respective user devices of the overlapping users.

8. The method of clause 7, wherein the query result represents an abstraction of data stored in the data service and excludes personal data associated with the overlapping users.

9. The method of clauses 7 and/or 8, further comprising sending, to the data service, redemption data indicating utilization of the promotion, wherein the third party service is authorized to retrieve the redemption data from the data service.

10. The method of any of clauses 7, 8, and/or 9, wherein the temporary viewing permission is associated with a condition, satisfaction of which causes termination of the temporary viewing permission.

11. The method of any of clauses 7, 8, 9, and/or 10, wherein the condition comprises receipt of the query result.

12. A system comprising: one or more processors; and non-transitory computer-readable instructions that, when executed by the one or more processors, cause the one or more processors to perform operations comprising: providing first data associated with users of a payment service to a data service, wherein: the first data includes a first portion of the first data with which the payment service has exclusive reading and control privileges; the data service is configured to store second data with which a service provider, different than the payment service, has exclusive reading and control privileges; and the second data is associated with users of the service provider; generating third data representing a query associated with one or more attributes of stored data by the data service; receiving, from the data service and in response to the query, a query result associated with the first portion of the first data and at least a portion of the second data, wherein the query result includes the at least the portion of the second data based at least in part on the service provider provisioning a temporary viewing permission to the payment service; and utilizing the query result to perform actions between the payment service and the service provider.

13. The system of clause 12, the operations further comprising: identifying first data types associated with the first data, wherein generating the third data includes indicating the first data types associated with the first data; receiving an indication of a second data type associated with the service provider, the second data type differing from the first data types; determining the one or more attributes based at least in part on the second data type; and sending, to the data service, the third data representing the query, wherein the at least the portion of the second data included in the query result is associated with the second data type.

14. The system of clauses 12 and/or 13, the operations further comprising: determining another service provider; generating fourth data representing a data query for data associated with the other service provider, the fourth data including at least a portion of the query result; and receiving, from the data service, a data query result that includes a portion of the data associated with the other service provider, wherein the data query result is based at least in part on the other service provider provisioning another temporary viewing permission to the payment service and to the service provider.

15. The system of any of clauses 12, 13, and/or 14, wherein the query result associated with the first portion of first data and the at least a portion of the second data includes: the first portion of the first data as maintained by the data service; and a version of the at least the portion of the second data that omits personal identification information related to the at least the portion of the second data as maintained by the data service.

16. The system of any of clauses 12, 13, 14, and/or 15, the operations further comprising: generating fourth data utilizing the query result; associating the fourth data with provision of another temporary viewing permission to the service provider based at least in part on the fourth data being generated utilizing the query result; and sending the fourth data to the data service.

17. The system of any of clauses 12, 13, 14, 15, and/or 16, the operations further comprising: receiving a request for temporary viewing permission from the data service, the request indicating the service provider as a requestor and data types associated with the service provider; and provisioning another temporary viewing permission based at least in part on the data types, the other temporary viewing permission indicating a revocation condition to be associated with the other temporary viewing permission.

18. The system of any of clauses 12, 13, 14, 15, 16, and/or 17, the operations further comprising: identifying a portion of the first data and the second data that are associated with a selected data type; and wherein the query results are associated with the first portion of the first data and the at least the portion of the second data based at least in part on the first portion of the first data and the at least the portion of the second data being of the selected data type.

19. The system of any of clauses 12, 13, 14, 15, 16, 17, and/or 18, the operations further comprising sending, to the data service, an indication of a targeted portion of the users associated with the service provider, wherein the indication is made available to the service provider from the data service, and wherein receiving the query result is based at least in part on the service provider indicating authorization to send at least the portion of the second data associated with the targeted portion of the users associated with the service provider.

20. The system of any of clauses 12, 13, 14, 15, 16, 17, 18, and/or 19, the operations further comprising: receiving, in response to the query, an indication of a condition to be satisfied by the payment service before receiving the query results, the condition determined from input data received from the service provider; sending fourth data indicating that the condition has been satisfied to the data service; and wherein receiving the query results is based at least in part on sending the fourth data.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to FIGS. 6-9 for convenience and ease of understanding. However, the methods illustrated are not limited to being performed using components described herein, and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

The foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process limitations (e.g., dimensions, configurations, components, process step order, etc.) can be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A method implemented at least in part by a computing device of a payment service, comprising:
providing, conditional on users of the payment service granting sharing permissions, personal data associated with the users of the payment service to a data service managed by a third party, wherein:
the personal data associated with the users of the payment service comprises a first portion of data stored by the data service with which the payment service has exclusive reading and control privileges;
the data service is configured to store a second portion of data with which a service provider, different than the payment service, has exclusive reading and control privileges; and
the second portion of data comprises personal data associated with users of the service provider;
configuring a query associated with one or more attributes of data stored by the data service;
receiving, from the data service and based at least in part on the service provider provisioning a temporary viewing permission to the payment service, a query result associated with the first portion of data and the second portion of data; and
utilizing the query result to perform actions between the payment service and the service provider.

2. The method of claim 1, wherein the temporary viewing permission is terminated based at least in part on the payment service receiving the query result.

3. The method of claim 1, further comprising provisioning another temporary viewing permission to the service provider for the service provider to view an abstracted version of the personal data.

4. The method of claim 1, wherein the query result represents an abstraction of the first portion of data and the second portion of data, based at least in part on the one or more attributes of the query, and excludes data indicated as personal data associated with the first portion of data and the second portion of data.

5. The method of claim 1, further comprising:
identifying a portion of the users that are associated with the payment service and the service provider from the query results; and
wherein the query results are associated with the portion of the users.

6. The method of claim 1, further comprising sending, to the data service, data indicating a targeted portion of the users associated with the service provider, wherein a version of the data is made available to the service provider from the data service.

7. A system comprising:
one or more processors; and
non-transitory computer-readable instructions that, when executed by the one or more processors, cause the one or more processors to perform operations comprising:
providing, conditional on users of a payment service granting sharing permissions, first data associated with the users of the payment service to a data service that differs from the system, the first data including at least personal data, wherein:
  the first data includes a first portion of the first data stored by the data service with which the payment service has exclusive reading and control privileges;
  the data service is configured to store second data with which a service provider, different than the payment service, has exclusive reading and control privileges; and
  the second data is associated with users of the service provider;
generating third data representing a query associated with one or more attributes of stored data by the data service;
receiving, from the data service and in response to the query, a query result associated with the first portion of the first data and at least a portion of the second data, wherein the query result includes the at least the portion of the second data based at least in part on the service provider provisioning a temporary viewing permission to the payment service; and
utilizing the query result to perform actions between the payment service and the service provider.

8. The system of claim 7, the operations further comprising:
identifying first data types associated with the first data, wherein generating the third data includes indicating the first data types associated with the first data;
receiving an indication of a second data type associated with the service provider, the second data type differing from the first data types;
determining the one or more attributes based at least in part on the second data type; and
sending, to the data service, the third data representing the query, wherein the at least the portion of the second data included in the query result is associated with the second data type.

9. The system of claim 7, the operations further comprising:
determining another service provider;
generating fourth data representing a data query for data associated with the other service provider, the fourth data including at least a portion of the query result; and
receiving, from the data service, a data query result that includes a portion of the data associated with the other service provider, wherein the data query result is based at least in part on the other service provider provisioning another temporary viewing permission to the payment service and to the service provider.

10. The system of claim 7, wherein the query result associated with the first portion of first data and the at least a portion of the second data includes:
the first portion of the first data as maintained by the data service; and
a version of the at least the portion of the second data that omits personal identification information related to the at least the portion of the second data as maintained by the data service.

11. The system of claim 7, the operations further comprising:
generating fourth data utilizing the query result;
associating the fourth data with provision of another temporary viewing permission to the service provider based at least in part on the fourth data being generated utilizing the query result; and
sending the fourth data to the data service.

12. The system of claim 7, the operations further comprising:
receiving a request for temporary viewing permission from the data service, the request indicating the service provider as a requestor and data types associated with the service provider; and
provisioning another temporary viewing permission based at least in part on the data types, the other temporary viewing permission indicating a revocation condition to be associated with the other temporary viewing permission.

13. The system of claim 7, the operations further comprising:
identifying a portion of the first data and the second data that are associated with a selected data type; and
wherein the query results are associated with the first portion of the first data and the at least the portion of the second data based at least in part on the first portion of the first data and the at least the portion of the second data being of the selected data type.

14. The system of claim 7, the operations further comprising sending, to the data service, an indication of a targeted portion of the users associated with the service provider, wherein the indication is made available to the service provider from the data service, and wherein receiving the query result is based at least in part on the service provider indicating authorization to send at least the portion of the second data associated with the targeted portion of the users associated with the service provider.

15. The system of claim 7, the operations further comprising:
receiving, in response to the query, an indication of a condition to be satisfied by the payment service before receiving the query results, the condition determined from input data received from the service provider;
sending fourth data indicating that the condition has been satisfied to the data service; and
wherein receiving the query results is based at least in part on sending the fourth data.

* * * * *